United States Patent
Hiramatsu et al.

(10) Patent No.: US 8,514,324 B2
(45) Date of Patent: *Aug. 20, 2013

(54) IMAGE INPUT APPARATUS, A METHOD OF CONTROLLING THEREOF AND A COMPUTER-READABLE STORAGE MEDIUM

(75) Inventors: Makoto Hiramatsu, Ebina (JP); Hajime Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 13/209,069

(22) Filed: Aug. 12, 2011

(65) Prior Publication Data

US 2011/0298950 A1  Dec. 8, 2011

Related U.S. Application Data

(63) Continuation of application No. 12/031,565, filed on Feb. 14, 2008, now Pat. No. 8,031,263.

(30) Foreign Application Priority Data

Feb. 19, 2007  (JP) ................................. 2007-038427
Feb. 20, 2007  (JP) ................................. 2007-039767

(51) Int. Cl.
*H04N 5/225*   (2006.01)

(52) U.S. Cl.
USPC ......................................................... 348/372

(58) Field of Classification Search
USPC ......................................................... 348/372
See application file for complete search history.

(56) References Cited

U.S. PATENT DOCUMENTS 6,253,023 B1 *  6/2001  Fukushima et al. .......... 386/227
8,031,263 B2 * 10/2011  Hiramatsu et al. ............ 348/372

* cited by examiner

*Primary Examiner* — James Hannett
(74) *Attorney, Agent, or Firm* — Canon USA Inc. IP Division

(57) ABSTRACT

An image capturing apparatus that commences a pre-shooting operation on a first stroke of a release button, executes a shooting operation on a second stroke of the release button, and stores generated image data in a connected storage medium. The image capturing apparatus includes a power supply unit adapted to supply power to the storage medium, and a controller configured to control the power supply unit so that the power supply to the storage medium is started in response to the first stroke of the release button going ON.

19 Claims, 25 Drawing Sheets

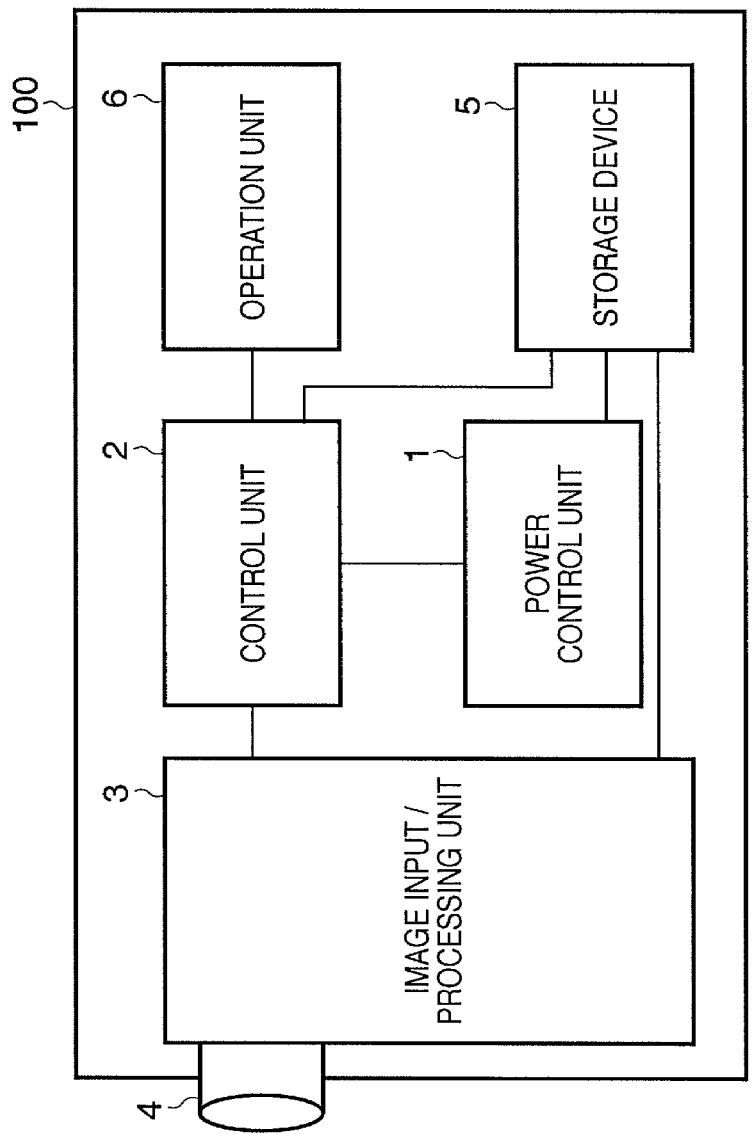

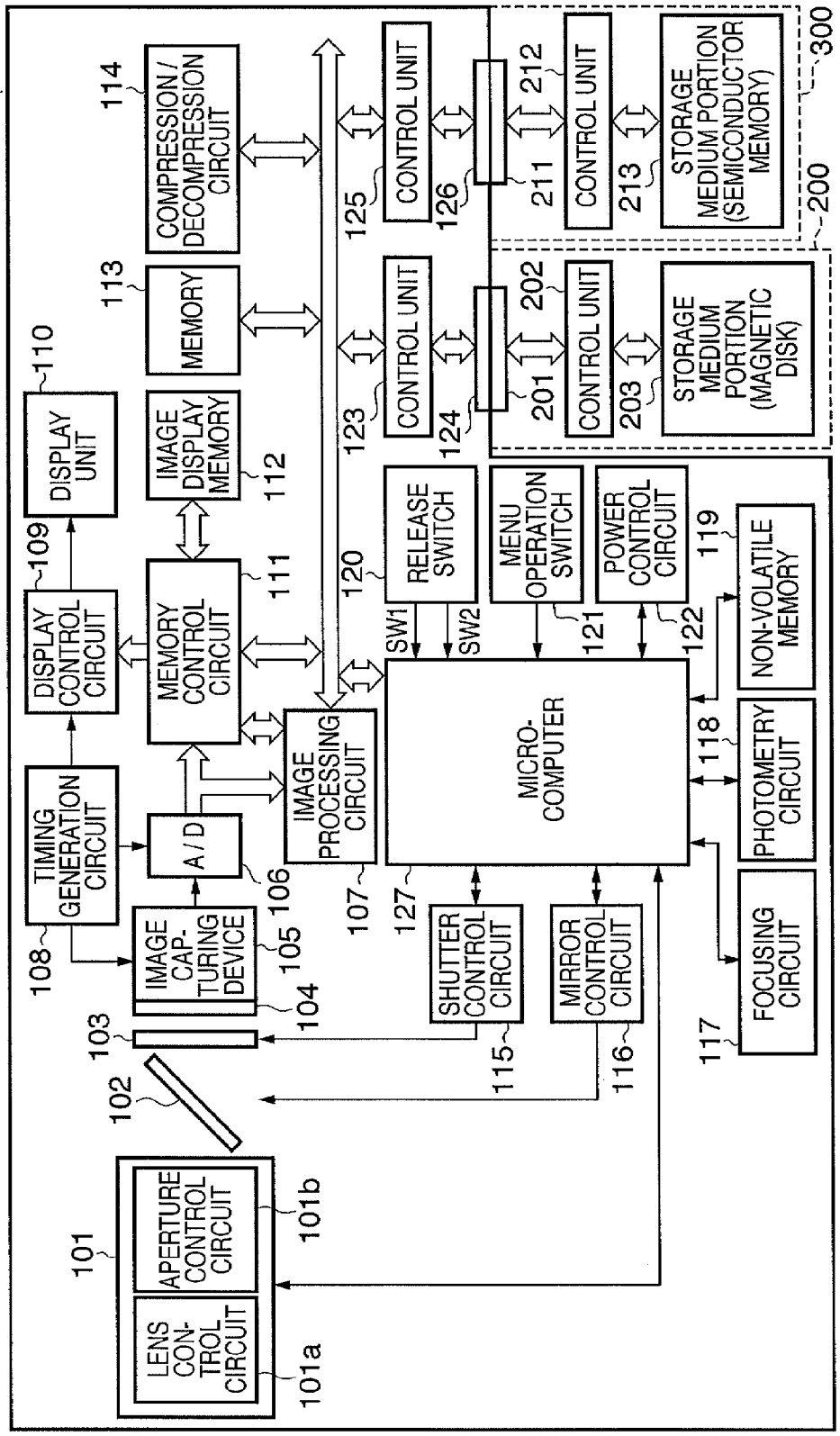

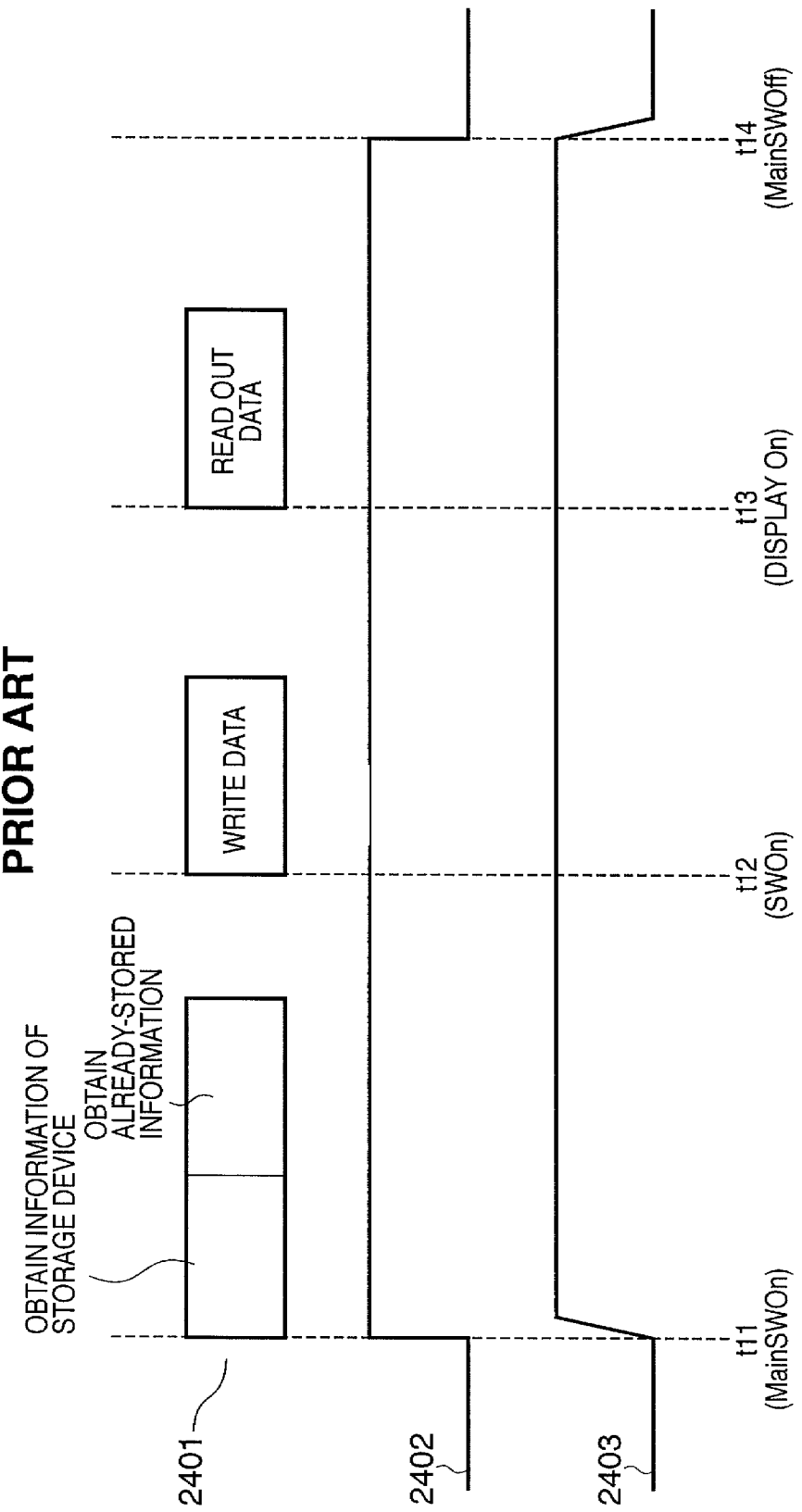

IMAGE INPUT APPARATUS, A METHOD OF CONTROLLING THEREOF AND A COMPUTER-READABLE STORAGE MEDIUM

CROSS REFERENCE TO RELATED APPLICATIONS

The present application is a Continuation of U.S. patent application Ser. No. 12/031,565 filed Feb. 14, 2008, which claims priority from Japanese Application No. 2007-038427 filed Feb. 19, 2007 and Japanese Patent Application No. 2007-039767 filed Feb. 20, 2007, the entire contents of each of which are hereby incorporated by reference.

BACKGROUND OF THE INVENTION

1. Field of the Invention

The present invention relates to an image capturing apparatus and a method of controlling thereof.

2. Description of the Related Art

Small-sized memory cards such as Compact Flash® cards or SD memory cards, whose storage media are semiconductor memories of a capacity in the range of several hundred bytes to several gigabytes, have conventionally been used in image input apparatuses, such as digital cameras, digital video cameras, and the like, as storage devices for image data.

Image data obtained through shooting is stored in such a memory card, the memory card being in a state in which it is inserted into a memory card slot provided in the body of the camera. However, the amount of image data that can be stored in a single memory card is limited, and increases in the amount of image data to be stored due to increases in the number of pixels used by image capturing devices have given rise to demand for higher-capacity storage media.

Meanwhile, HDDs (hard disk drives), whose storage media are magnetic disks, are being used as storage media with higher capacity and lower costs than semiconductor memories. Connecting this kind of HDD externally via USB or the like to a digital camera to use as the digital camera's storage medium, and utilizing the HDD in such a manner, has been proposed (see Japanese Patent Laid-Open No. 2001-238112).

FIG. 22 illustrates a configuration of such a conventional image input apparatus. An image input apparatus 10 includes a control unit 2, an image input and image processing unit 3, an optical member 4, a storage device 5, an operation unit 6, and a power control unit 7.

The power control unit 7 controls power within the image input apparatus 10, including the power of the storage device 5, in accordance with control signals from the control unit 2. The control unit 2 controls the power control unit 7 and the image processing unit 3 according to the status of the image input apparatus 10. The control unit 2 also communicates with the storage device 5 in order to acquire information for identifying the storage device 5.

The image processing unit 3 processes image information, the image information being inputted via the optical member 4 based on instructions to commence shooting operations accepted by the operation unit 6, generates image data, and sends the generated image data to the storage device 5. The image processing unit 3 may also include a display unit for displaying image data. This display unit may be configured of a liquid-crystal display, an organic EL display, or the like. The image processing unit 3 reads out image data from the storage device 5 based on instructions to commence image data play back operations accepted by the operation unit 6, and displays this image data on the display unit.

The storage device 5 internally stores the image data received from the image processing unit 3. The storage device 5 is realized by a semiconductor memory such as a Compact Flash® card or an SD memory card, which is inserted into a dedicated slot and integrated thereby with the image input apparatus 10.

The configuration of the power control unit 7 is illustrated in FIG. 23. The power control unit 1 includes a battery 30 and a DC-DC converter 11. The battery 30 is connected to the DC-DC converter 11. The DC-DC converter 11 performs voltage conversion on the power supplied by the battery 30 in accordance with a control signal 12 supplied by the control unit 2, and generates power 16 for the various constituent elements of the image input apparatus 10. Power 13 is also supplied by the DC-DC converter 11 to the storage device 5.

Next, a sequence through which the power control unit 7 of the image input apparatus 10 supplies power to the storage device 5 shall be described with reference to FIG. 24. In FIG. 24, 2401 represents operations performed with respect to the storage device 5. 2402 represents the waveform of the control signal 12, used for supplying power from the DC-DC converter 11 to the storage device 5. With regards to 2402, the LOW state represents a state in which the power supply from the DC-DC converter 11 is stopped, whereas the HIGH state represents a state in which power is being supplied from the DC-DC converter 11. 2403 represents the operational status of the storage device 5, which is supplied with power and operates in accordance with the control signal 12. Therefore, the operations of the storage device 5 are stopped when 2403 is in the LOW state pursuant to the control signal 12 being in the LOW state, whereas the storage device 5 is started up and is in an operational state when the control signal 12 is in the HIGH state. When the control signal 12 changes from the HIGH state to the LOW state, the operations of the storage device 5 are stopped in accordance therewith.

The horizontal axis in FIG. 24 expresses time. At time t11, a power button provided in the operation unit 6 is manipulated, thereby turning on the main power of the image input apparatus 10. Simultaneous to the main power being turned on, the control signal 12 enters the HIGH state; the power of the storage device 5 is turned on in accordance therewith, and the storage device 5 enters an operational state. Information of the storage device 5 is then acquired through information exchange carried out between the image processing unit 3 and the storage device 5, and furthermore, already-stored information is checked.

After this, at time t12, a shutter switch provided in the operation unit 6 is manipulated, and the image data generated in accordance with this operation is stored in the storage device 5. At time t13, a play back button provided in the operation unit 6 is manipulated, and the image data stored in the storage device 5 is read out in accordance with this operation.

Furthermore, at time t14, the power button is manipulated, cutting off the main power of the image input apparatus 10; accordingly, the control signal 12 enters the LOW state, in response to which the power to the storage device 5 is cut off, and the storage device 5 enters a state in which operations are stopped.

With this kind of method for supplying power to a storage device, the storage device is constantly in a state in which it is being supplied with power, even when not being accessed by the image processing unit; this leads to wasteful consumption of the power of the battery 30. If, under such conditions, the capacity of the storage device is increased in accordance with an increase in the size of images to be stored in the image input apparatus, the power is exhausted in order to keep the storage device in an operational state, giving rise to a problem in that shooting quickly becomes impossible. Furthermore, when using a device such as an HDD as the storage device which provides a large storage capacity at a low cost, amount of power consumed by the device is great, giving rise to another problem in that power cannot be supplied.

In the case where a mobile device such as a digital camera serves as a USB host machine, and a peripheral device such as an HDD is connected to the host machine, it is necessary to consider power management for the overall system, which is made up of both the mobile device and the peripheral device. For example, a power saving mode, which actively stops power from being supplied to the peripheral device and reduces power consumption thereby, is necessary.

Some USB-connected peripheral devices take several seconds or more to become operational after power is supplied thereto. In addition, with an HDD, it takes several seconds or more after the included magnetic disks begin spinning before actual reading/writing can take place.

Because of this, when using an HDD as a storage medium in a digital camera, it is impossible to avoid negatively influencing the storage timing, play back timing, and so on when shooting or when playing back image data. In mobile devices that demand quick responsiveness, such as digital cameras, the time required for the device to exit a power saving mode and become functional greatly affects the performance of the device.

SUMMARY OF THE INVENTION

The present invention manages the power of a storage device in an image input apparatus, and makes the efficient use of the storage device in an image input apparatus possible.

Furthermore, the present invention reduces power consumption and enables an improvement in operability, even when a device with high energy consumption and that takes time to start up is used as the storage medium.

According to an aspect of embodiments of the present invention, the present invention relates to an image capturing apparatus that commences a pre-shooting operation on a first stroke of a release button, executes a shooting operation on a second stroke of the release button, and stores generated image data in a connected storage medium. Here, the image capturing apparatus includes a power supply unit configured to supply power to the storage medium, and a controller configured to control the power supply unit so that the power supply to the storage medium is started in response to the first stroke of the release button going ON.

According to another aspect of the embodiments of the present invention, the present invention relates to an image capturing apparatus having a display unit that displays image data stored in a storage medium or a setting screen of the image capturing apparatus. Here, the image capturing apparatus includes a switching unit adapted to switch the operational state of the storage medium to a normal operation mode in which the image data can be stored in the storage medium or a power saving operation mode in which the image data cannot be stored in the storage medium, and a controller adapted to control the switching unit not to switch from the normal operation mode to the power saving operation mode when the image data or the setting screen is being displayed on the display unit.

According to a further aspect of the embodiments of the present invention, the present invention relates to an image capturing apparatus that commences a pre-shooting operation on a first stroke of a release button, executes a shooting operation on a second stroke of the release button, and stores generated image data in a connected storage medium. Here, the image capturing apparatus includes a switching unit configured to switch the operational state of the storage medium to a normal operation mode in which the image data can be stored in the storage medium or a power saving operation mode in which the image data cannot be stored in the storage medium, and a controller configured to control the switching unit to switch from the power saving operation mode to the normal operation mode in response to the first stroke of the release button going ON.

Further features and aspects of the present invention will become apparent from the following description of exemplary embodiments with reference to the attached drawings.

BRIEF DESCRIPTION OF THE DRAWINGS

FIG. 1A is a diagram illustrating an exemplary configuration of an image input apparatus according to a first embodiment of the present invention.

FIG. 15 is a function block diagram of an interchangeable lens-type digital camera according to a fourth embodiment of the present invention.

FIG. 24 is a timing diagram illustrating a conventional sequence.

DESCRIPTION OF THE EMBODIMENTS

Figure 1B:
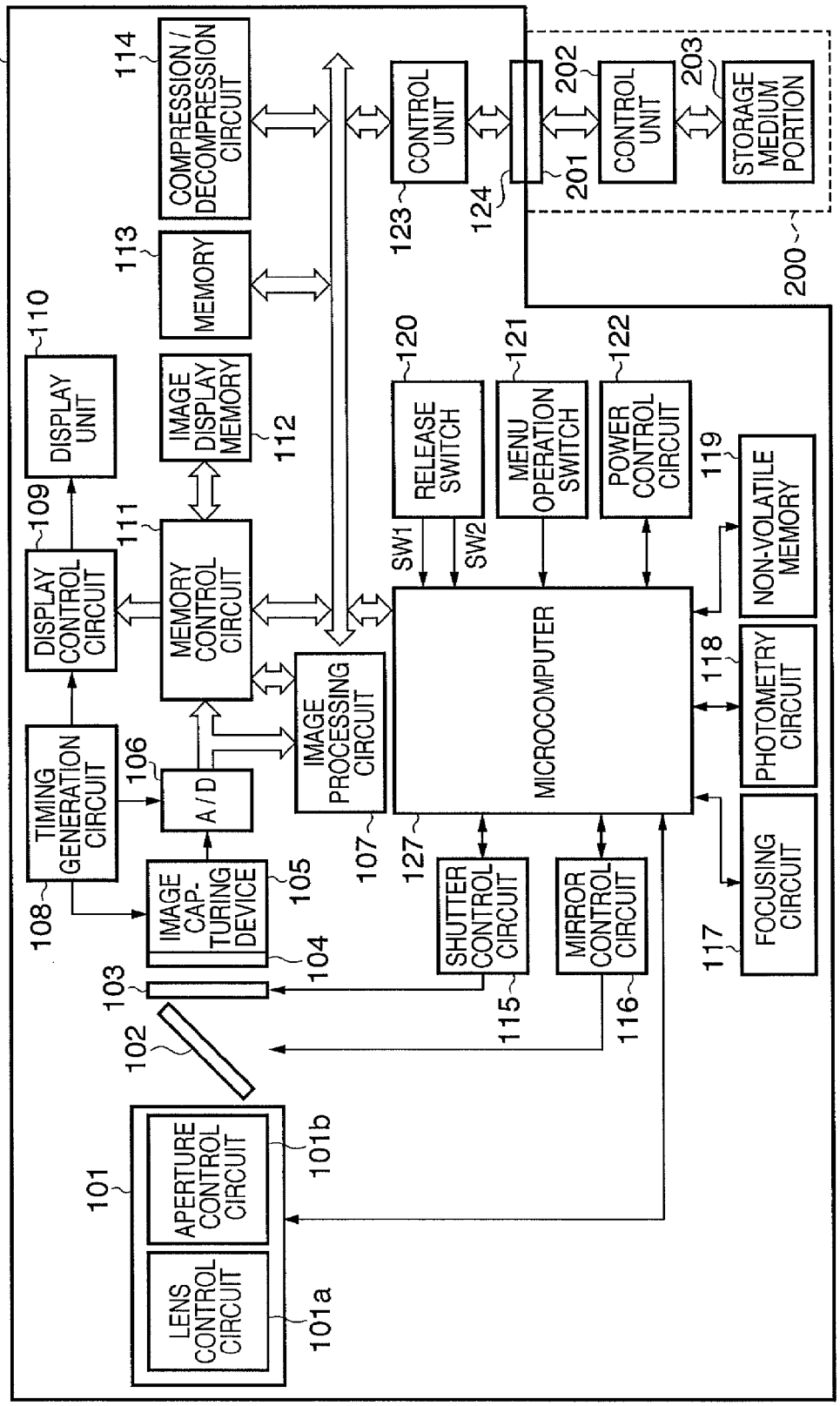
FIG. 1B is a function block diagram of an interchangeable lens-type digital camera according to the first embodiment of the present invention.

Hereinafter, various embodiments, features and aspects of the present invention will be described in detail with reference to the appended drawings.

First Exemplary Embodiment

FIG. 1A illustrates an exemplary configuration of an image input apparatus according to embodiments of the present invention. An image input apparatus 100 as shown in FIG. 1A includes a power control unit 1, a control unit 2, an image processing unit 3, an optical member 4, a storage device 5, and an operation unit 6.

The image input apparatus according to the present embodiment can be realized as, for example, a digital still camera, a digital video camera, a mobile telephone with a built-in camera, a mobile information terminal with a built-in camera, a laptop computer, or the like.

The power control unit 1 controls power within the image input apparatus 1, including the power of the storage device 5, in accordance with control signals from the control unit 2. The control unit 2 controls the power control unit 1 and the image processing unit 3 according to the status of the image input apparatus 100. The control unit 2 also communicates with the storage device 5 in order to acquire information for identifying the storage device 5.

The image processing unit 3 processes image information, the image information being inputted via the optical member 4 based on instructions to commence shooting operations accepted by the operation unit 6, generates image data, and sends the generated image data to the storage device 5. The image processing unit 3 may also include a display unit for displaying image data, notification messages, and the like. This display unit may be configured of a liquid-crystal display, an organic EL display, or the like. The image processing unit 3 reads out image data from the storage device 5 based on instructions to commence image data play back operations accepted by the operation unit 6, and displays this image data on the display unit.

The storage device 5 internally stores the image data received from the image processing unit 3. The storage device 5 is realized by a semiconductor memory such as a Compact Flash® card or an SD memory card, which is inserted into a dedicated slot and integrated thereby with the image input apparatus 100.

Next, the functional configuration of the image input apparatus illustrated in FIG. 1A shall be described in further detail with reference to FIG. 1B which is a function block diagram of an interchangeable lens-type digital camera according to the first embodiment of the present invention.

Now referring to FIG. 1B, it is noted that the optical member 4 shown in FIG. 1A may include a shooting lens unit 101, a quick-return mirror 102, a shutter 103, an optical filter 104, and an image capturing device 105 as shown in FIG. 1B. The image processing unit 3 shown in FIG. 1A may include an A/D converter 106, an image processing circuit 107, a timing generation circuit 108, a display control circuit 109, a display unit 110, a memory 113, and a compression/decompression circuit 114.

Moreover, the control unit 2 shown in FIG. 1A may include a memory control circuit 111, an image display memory 112, a shutter control circuit 115, a mirror control circuit 116, a focusing circuit 117, a photometry circuit 118, a non-volatile memory 119, and a microcomputer 127.

Furthermore, the operation unit 6 shown in FIG. 1A may include a release switch 120 and a menu operation switch 121, while the power control unit 1 is configured of a power control circuit 122. And still further, the storage device 5 shown in FIG. 1A may include a control unit (I/F) 123, a connector 124, a connector 201, a control unit 202, and a storage medium portion 203. The digital camera 100 (image input apparatus, or image capturing apparatus) shown in FIG. 1B includes the interchangeable shooting lens unit 101, which is configured of plural lens groups.

By communicating with the microcomputer 127 and controlling a lens control circuit 101a, the shooting lens unit 101 can move a focusing lens (not shown), thereby performing focusing operations. The amount of movement at this time is calculated based on the output of the focusing circuit 117. An aperture control circuit 101b, which changes an optical aperture value, is also provided in the shooting lens unit 101.

The quick-return mirror 102 is disposed in the optical path for shooting, and is capable of moving between a position that leads the light of a subject from the shooting lens into a finder optical system (not shown) and a position outside of the optical path for shooting. The shutter 103, the optical filter 104 covered in dust-resistant glass, and the image capturing device 105 that converts an optical image into electrical signals are disposed behind the quick-return mirror 102. Analog signals outputted from the image capturing device 105 are converted into digital signals by the A/D converter 106.

The timing generation circuit 108 supplies clock signals, control signals, and the like to the image capturing device 105 and the A/D converter 106. The timing generation circuit 108 is controlled by the memory control circuit 111 and the microcomputer 127.

The image processing circuit 107 performs a predetermined pixel interpolation process, a developing process, or the like on data from the A/D converter 106 or image data from the memory control circuit 111, based on processing data that has been added to the image data. The memory control circuit 111 controls the A/D converter 106, the image processing circuit 107, the timing generation circuit 108, the image display memory 112, the memory 113, and the compression/decompression circuit 114.

The data from the A/D converter 106 is written into the image display memory 112 or the memory 113 via the image processing circuit 107 and the memory control circuit 111. Image data for display written into the image display memory 112 is displayed on the display unit 110, which is configured of a liquid-crystal display or the like, by the display control circuit 109. Various setting menu items for the image input apparatus 100 are also displayed on the display unit 110.

The memory 113 is used as an image buffer area for temporarily storing uncompressed image data that has been shot. The memory 113 is also used as a working buffer area for holding processing data used when the image processing circuit 107 performs developing processing on image data or AF/AE/AWB process results, storing other temporarily-used data, and so on. Furthermore, the memory 113 is used as a file buffer area for storing compressed image data that has been compressed by the compression/decompression circuit 114. The memory 113 is provided with a storage capacity sufficient to store a predetermined number of still images, a predetermined time's worth of moving images, and so on. Accordingly, it is possible to quickly write large amounts of images into the memory 113, such as when shooting continuous exposures, where plural still images are shot in succession.

The compression/decompression circuit 114 is a circuit that compresses/decompresses image data using the JPEG format through an adaptive discrete cosine transfer (ADCT) or the like. The compression/decompression circuit 114 reads out image data stored in the memory 113, compresses or decompresses the data, and then writes the processed data into the memory 113. The shutter control circuit 115 controls the shutter 103; the mirror control circuit 116 controls the quick-return mirror 102, driving it into and out of the optical path for shooting; and the focusing circuit 117 controls the focusing lens of the shooting lens unit 101 based on the output thereof. The photometry circuit 118 measures the brightness of the subject and controls the exposure based on that output.

Various programs, such as a program for performing shooting processing, a program for performing image processing, and a program for storing created image file data in the storage medium 200, are stored in the non-volatile memory 119. Furthermore, various programs for implementing and executing multi-task configurations for the abovementioned programs, such as an OS or the like, as well as regulation values for performing various controls, are stored in the non-volatile memory 119.

The release switch 120 instructs shooting preparation operations, such as AF (auto-focus) processing, AE (auto-exposure) processing, and so on, to be commenced when a release button is depressed halfway and a SW1 is turned on (a first stroke). The release switch 120 also instructs a series of processes including shooting processing, white balance correction processing, developing processing, and storage processing to be commenced when the release button is fully depressed and a SW2 is turned on (a second stroke). In the shooting processing, a signal read out from the image capturing device 105 is passed through the A/D converter 106 and the memory control circuit 111, and the resulting image data is written into the memory 113. The white balance correction processing uses the image processing circuit 107 to correct the white balance in the image data in accordance with the set white balance mode. In the storage processing, the developed image data is read out from the memory 113, compressed by the compression/decompression circuit 114, and written into the storage medium 200.

The menu operation switch 121 is configured of a combination of a play back key (play back button), a menu key (menu button), a set key, and a cross key (not shown). The menu operation switch 121 is a switch that instructs the play back of the image data stored in the storage medium 200 on the display unit 110, through manipulation of the play back key. The menu operation switch 121 is also a switch for displaying, on the display unit 110, setting menu items for various operations (a setting screen), such as changes for various settings including shooting conditions and developing conditions, selection of the power saving mode for the storage medium 200, and so on, via the menu key. Furthermore, using the menu operation switch 121, desired settings can be selected/set by manipulating the set key and cross key, while the screen display is being viewed.

The power control circuit 122 is configured of a battery detection circuit, a DC-DC converter, a switch circuit that switches blocks through which power flows, and so on. A detailed configuration of the power control circuit 122 shall be provided with reference to FIG. 2. The power control circuit 122 detects the presence/absence of a battery, the type of the battery, and the amount of power remaining in the battery, controls the DC-DC converter based on the results of the detection and instructions from the microcomputer 127, and supplies the necessary power to the exterior, including the storage medium 200, for the necessary period.

The storage medium 200 is connected to the connector 124, and the storage medium 200 that is connected to the connector 124 is controlled by the control unit 123. The control unit 123 is configured of a host controller for allowing the image input apparatus 100 to function as a USB host machine.

It is noted that although a single system made up of the control unit 123 and the connector 124 is provided for the storage medium 200 in the present embodiment, plural systems made up of control units 123 and connectors 124 may be provided, and furthermore, a control unit 123 and a connector 124 of differing standards may be combined as well.

In the present embodiment, a semiconductor memory, for example, is used as the storage medium 200. The configuration used here may have the storage medium 200 disposed entirely within the housing of the image input apparatus 100, or may have the storage medium 200 external to the housing of the image input apparatus 100, connected thereto via a cable or the like. However, the configuration of the present embodiment has the storage medium 200 disposed entirely within the image input apparatus 100, via a dedicated slot.

The storage medium 200 includes the storage medium portion 203, which is configured of a semiconductor memory, the control unit 202 that serves as an interface with the image input apparatus 100 and controls the storage medium portion 203, and the connector 201 that connects to the connector 124. The control unit 123 is connected to the control unit 202 so as to be capable of communication, and furthermore, power can be supplied to the storage medium 200 while in this connected state.

Figure 2:
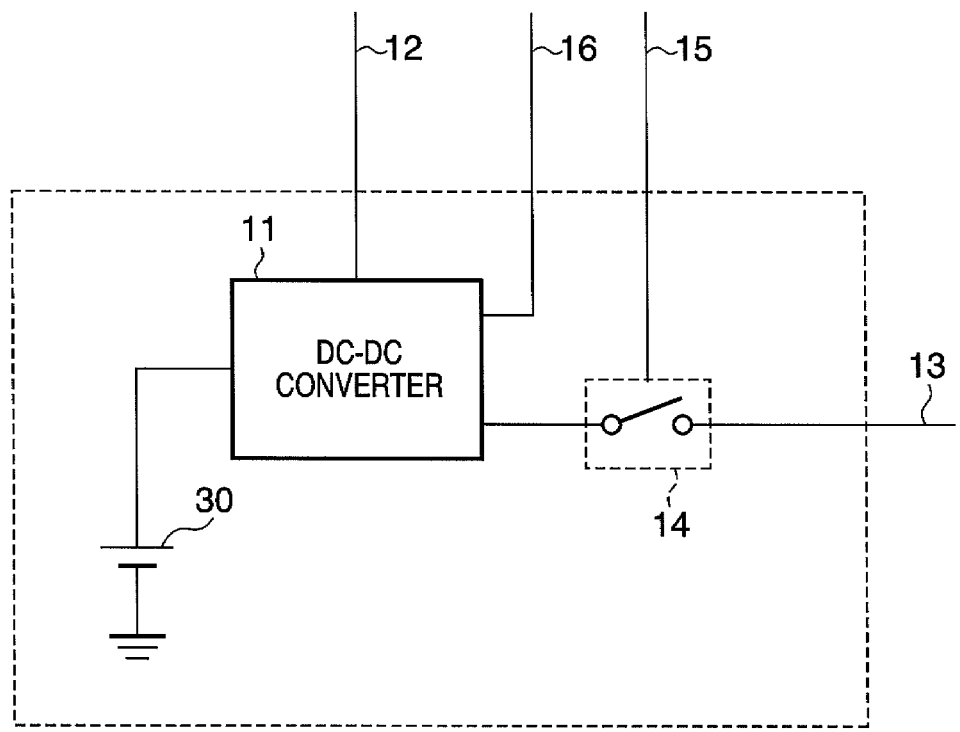
FIG. 2 is a diagram illustrating an exemplary configuration of a power control unit according to the first embodiment of the present invention.

Next, the configuration of the power control unit 1 shown in FIG. 1A shall be described. An exemplary configuration of the power control unit 1 is illustrated in FIG. 2. The power control unit 1 includes a battery 30, a DC-DC converter 11, and a switch 14. The battery 30 and DC-DC converter 11 are connected to one another and together function as a power supply unit. The DC-DC converter 11 performs voltage conversion on the power supplied by the battery 30 in accordance with a control signal 12 supplied by the control unit 2, and generates power 16 for the various constituent elements of the image input apparatus 100. The DC-DC converter 11 is also connected to the switch 14. The switch 14 is switched ON/OFF in accordance with a switch signal 15 from the control unit 2, and thus functions as a switching unit for switching the state of the power supply to the storage device 5. Accordingly, the supply of power 13 to the storage device 5 can be controlled independent of the power supplied to the other constituent elements within the image input apparatus 100.

Next, a sequence through which the power control unit 1 supplies power to the storage device 5 when the image input apparatus 100 is started up shall be described with reference to FIG. 3.

Figure 3:
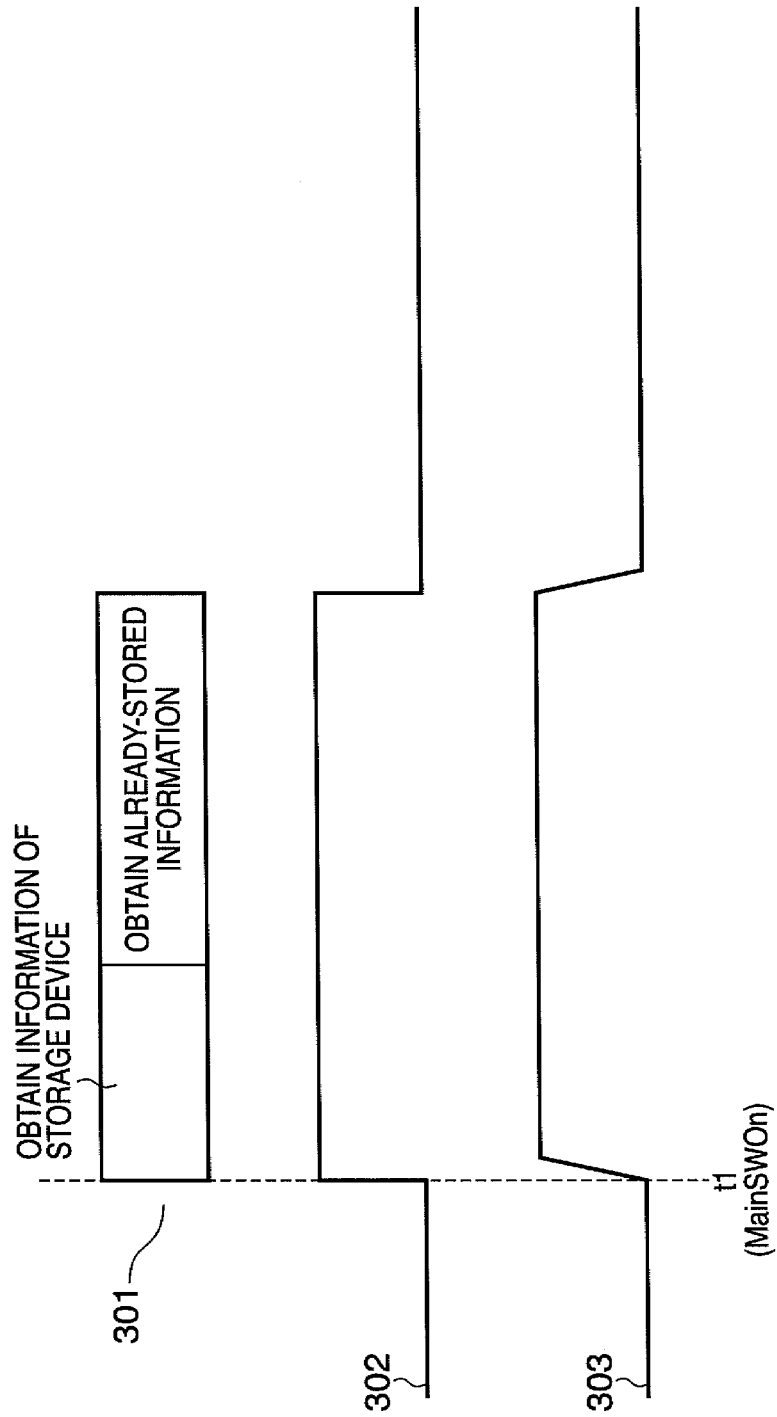
FIG. 3 is a timing diagram illustrating an example of a sequence performed when starting up an image input apparatus according to the first embodiment of the present invention.

In FIG. 3, 301 represents operations performed with respect to the storage device 5. Reference number 302 represents the waveform of the switching signal 15 from the control unit 2. With regards to 302, the LOW state indicates that the switch 14 is OFF, and that the power 13 supplied from the DC-DC converter 11 to the storage device 5 is stopped. This state, in which the power supply is stopped, is also referred to as a "power saving mode". On the other hand, the HIGH state indicates that the switch 14 is ON, and that power 13 is being supplied from the DC-DC converter 11 to the storage device 5.

Reference number 303 indicates the operational state of the storage device 5, the supply of power 13 of which is controlled in accordance with the switching signal 15. Therefore, the operations of the storage device 5 are stopped when 303 is in the LOW state pursuant to the switching signal 15 being in the LOW state, whereas the storage device 5 is started up and is in an operational state when the switching signal 15 is in the HIGH state. When the switching signal 15 changes from the HIGH state to the LOW state, the operations of the storage device 5 are stopped in accordance therewith, and the storage device 5 enters the power saving mode.

The horizontal axis in FIG. 3 expresses time. At time t1, a power button provided in the operation unit 6 is manipulated, thereby turning on the main power of the image input apparatus 100. Simultaneous to the main power being turned on, the switching signal 15 enters the HIGH state; the power of the storage device 5 is turned on in accordance therewith, and the storage device 5 enters an operational state. Information of the storage device 5 is then acquired through information exchange carried out between the control unit 3 and the storage device 5, and furthermore, already-stored information is checked. Here, a serial number or the like is included in the information of the storage device 5 as identification information for identifying the storage device 5. This operation shall be referred to as an "initialization operation". This initialization operation is an operation that is required to be carried out when the storage device 5 is started up in order for the image input apparatus 1 to utilize the storage device 5. When the initialization operation finishes, the control unit 2 changes the switching signal 15 to the LOW state, thereby stopping the supply of power 13 to the storage device 5.

Next, a sequence through which the power control unit 1 supplies power to the storage device 5 when the image input apparatus 100 is performing a shooting operation shall be described with reference to FIG. 4.

Figure 4:
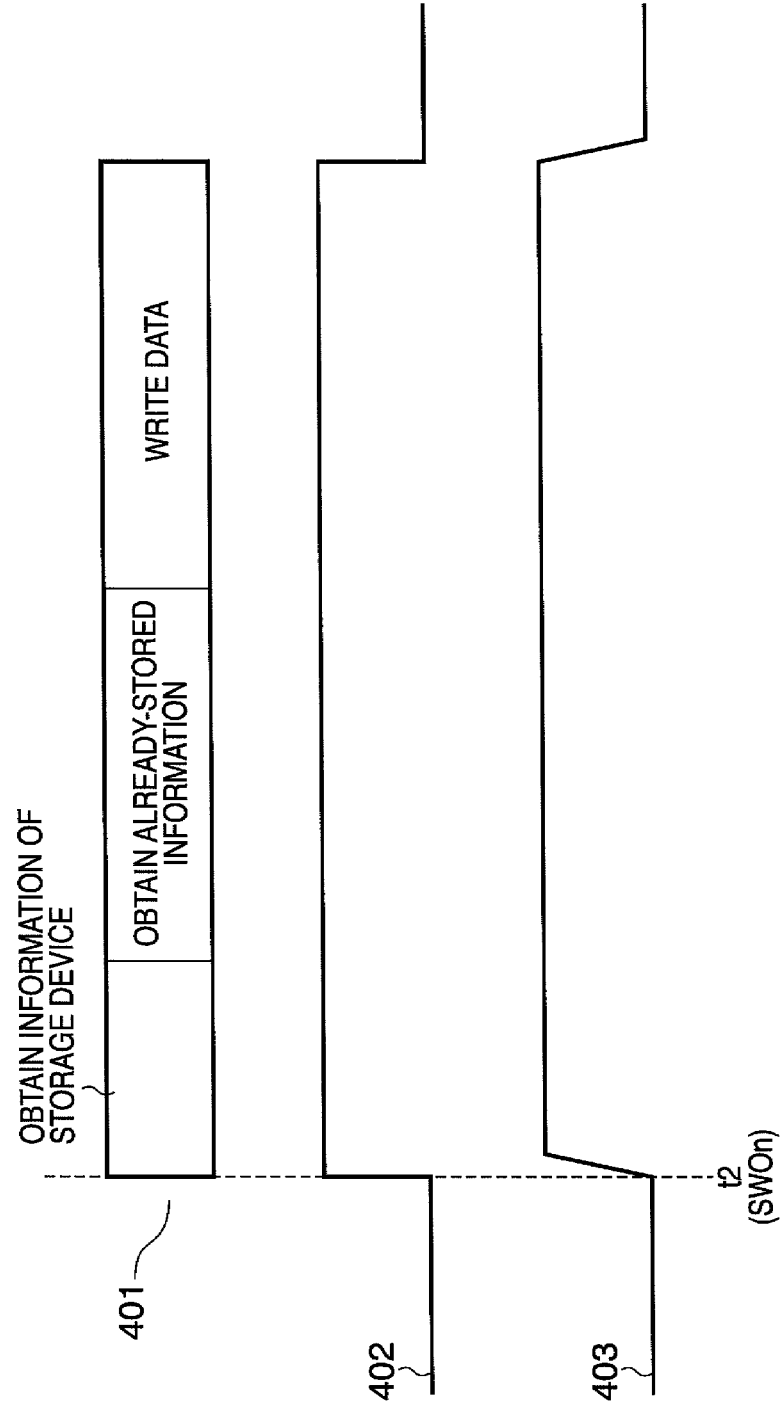
FIG. 4 is a timing diagram illustrating an example of a sequence performed during shooting operations according to the first embodiment of the present invention.

In FIG. 4, 401 represents operations performed with respect to the storage device 5. 402 represents the waveform of the switching signal 15 from the control unit 2. With regards to 402, the LOW state indicates that the switch 14 is OFF, and that the power 13 supplied from the DC-DC converter 11 to the storage device 5 is stopped. On the other hand, the HIGH state indicates that the switch 14 is ON, and that power 13 is being supplied from the DC-DC converter 11 to the storage device 5.

Reference numeral 403 indicates the operational state of the storage device 5, the supply of power 13 of which is controlled in accordance with the switching signal 15. Therefore, the operations of the storage device 5 are stopped when 403 is in the LOW state pursuant to the switching signal 15 being in the LOW state, whereas the storage device 5 is started up and is in an operational state when the switching signal 15 is in the HIGH state. When the switching signal 15 changes from the HIGH state to the LOW state, the operations of the storage device 5 are stopped in accordance therewith the aforementioned.

The horizontal axis in FIG. 4 expresses time. At time t2, the shutter switch provided in the operation unit 6 is manipulated so as to commence shooting operations in the image input apparatus 100. In response to the shutter switch being manipulated, the switching signal 15 changes to the HIGH state; the power to the storage device 5 is turned on in accordance therewith, and the storage device 5 enters an operational state. After this, the initialization operation is performed; however, if it is determined that the information of the storage device 5 obtained through the initialization operation is different from the information confirmed the previous time the storage device 5 was started up, the control unit 2 uses the display unit as a notifying unit to notify the user of the difference in the information. In this case, it can be assumed that, for example, the storage device 5 has been exchanged for another storage device.

After this, the image data generated in accordance with the manipulation of the shutter switch is stored in the storage device 5. When the storage of the image data finishes, the control unit 2 changes the switching signal 15 to the LOW state, thereby stopping the supply of power 13 to the storage device 5 and putting the storage device 5 in the power saving mode. However, if the next shooting operation has commenced at the point in time when the storage of the image data has finished, the switching signal 15 is kept at the HIGH state, and newly-generated image data is stored.

Next, a sequence through which the power control unit 1 supplies power to the storage device 5 when the image input apparatus 100 is executing a play back of image data shall be described with reference to FIG. 5.

Figure 5:
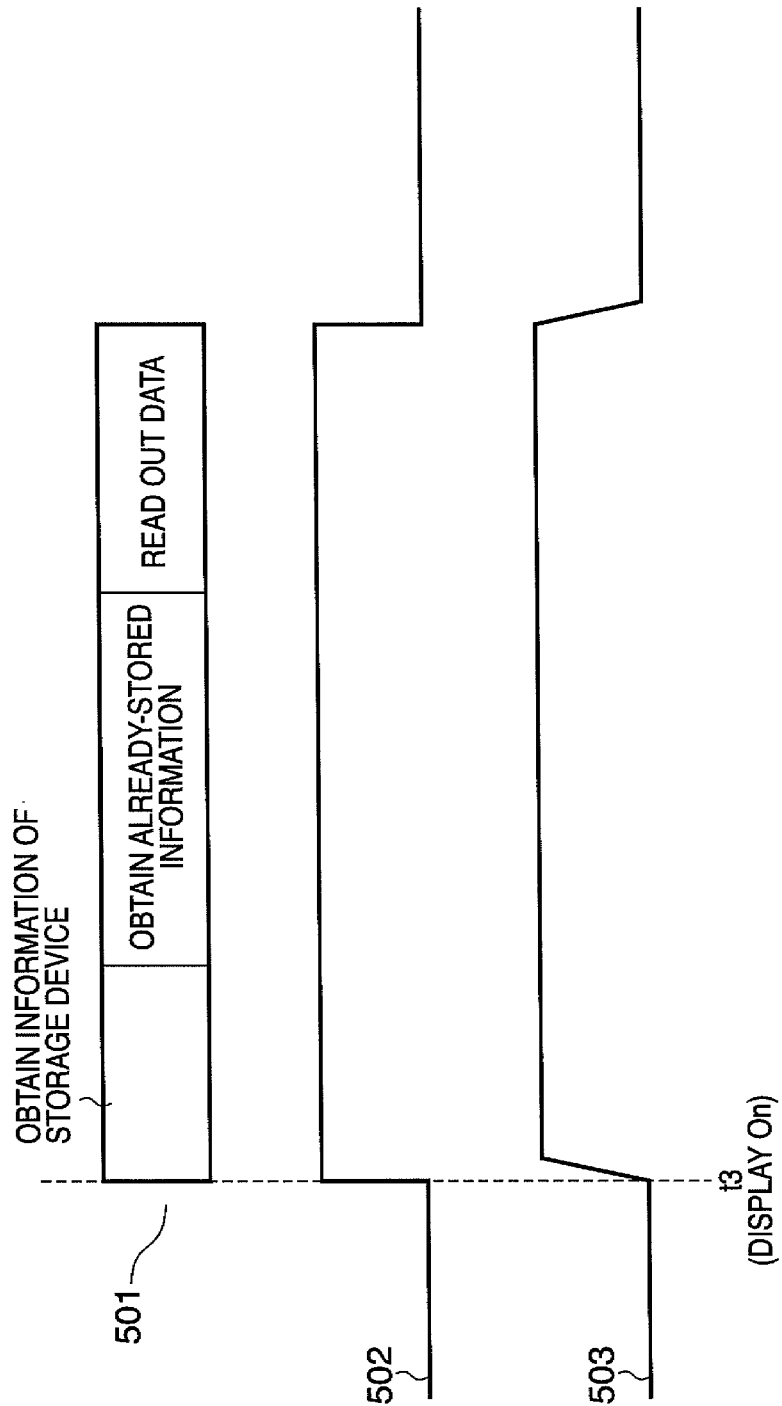
FIG. 5 is a timing diagram illustrating an example of a sequence performed during image play back according to the first embodiment of the present invention.

In FIG. 5, 501 represents operations performed with respect to the storage device 5. 502 represents the waveform of the switching signal 15 from the control unit 2. With regards to 502, the LOW state indicates that the switch 14 is OFF, and that the power 13 supplied from the DC-DC converter 11 to the storage device 5 is stopped. On the other hand, the HIGH state indicates that the switch 14 is ON, and that power 13 is being supplied from the DC-DC converter 11 to the storage device 5.

Reference numeral 503 indicates the operational state of the storage device 5, the supply of power 13 of which is controlled in accordance with the switching signal 15. Therefore, the operations of the storage device 5 are stopped when 503 is in the LOW state pursuant to the switching signal 15 being in the LOW state, whereas the storage device 5 is started up and is in an operational state when the switching signal 15 is in the HIGH state. When the switching signal 15 changes from the HIGH state to the LOW state, the operations of the storage device 5 are stopped in accordance therewith, and the storage device 5 enters the power saving mode.

The horizontal axis in FIG. 5 expresses time. At time t3, the play back button provided in the operation unit 6 is manipulated so as to commence operations for executing a play back of image data stored in the storage device 5. In response to the play back button being manipulated, the switching signal 15 changes to the HIGH state; the power to the storage device 5 is turned on in accordance therewith, and the storage device 5 enters an operational state. After this, the initialization operation is performed; however, if it is determined that the information of the storage device 5 obtained through the initialization operation is different from the information confirmed the previous time the storage device 5 was started up, the control unit 2 uses the display unit as a notifying unit to notify the user of the difference in the information. In this case, it can be assumed that, for example, the storage device 5 has been exchanged for another storage device.

After this, the image data read out from the storage device 5 in response to the button being manipulated is supplied to the image processing unit 3, and is played back/displayed on the display unit. When the play back/display of the image data finishes, the control unit 2 changes the switching signal 15 to the LOW state, thereby stopping the supply of power 13 to the storage device 5 and putting the storage device 5 in the power saving mode. However, if the next button manipulation for executing a play back of image data has been commenced at the point in time when play back of the image data has finished, the switching signal 15 is kept at the HIGH state, and the play back of the image data is executed.

According to the present embodiment, the power of the image input apparatus 100 can be used in an effective manner by supplying power from the power control unit 1 to the storage device 5 only when the storage device 5 needs to be accessed. This also makes it possible to equip the image input apparatus 100 with a storage device having a large capacity and a high rate of energy consumption.

Second Exemplary Embodiment

An apparatus configuration according to the present embodiment shall be described with reference to FIG. 6. In the present embodiment, a storage device 5 is realized by a hard disk disposed external to an image input apparatus 100. The image input apparatus 100 according to the present embodiment is therefore configured as shown in FIG. 6.

Figure 6:
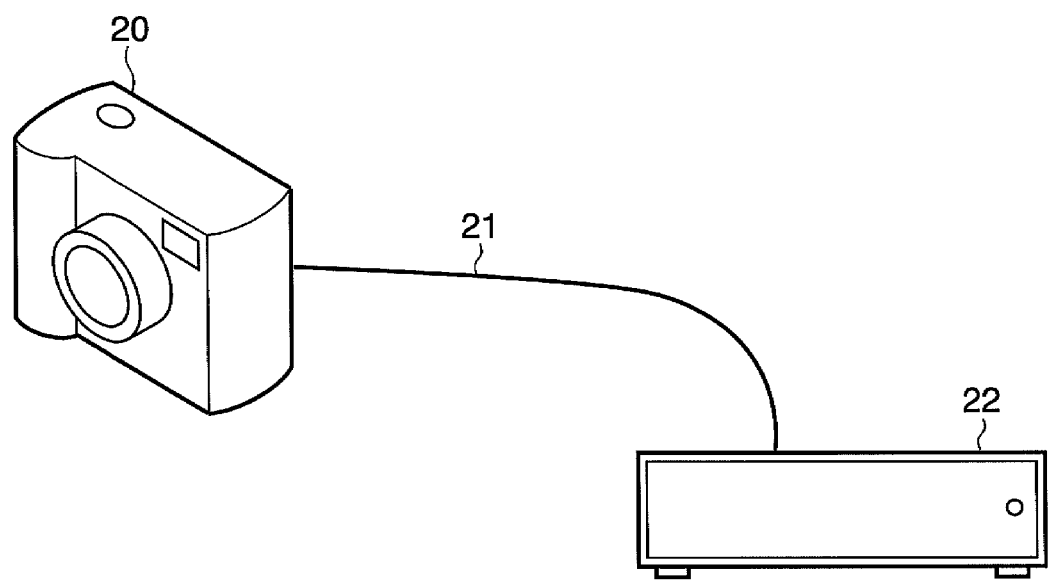
FIG. 6 is a diagram illustrating an exemplary configuration of an image input apparatus according to a second embodiment of the present invention.

In FIG. 6, a digital camera 20 is USB-connected to a hard disk 22, which is an external storage device, via a USB cable 21. The digital camera 20 includes a power control unit 1, a control unit 2, an image processing unit 3, and an optical member 4, as shown in FIG. 1A. The hard disk 22 functions as the storage device 5.

In the present embodiment, the digital camera 20 is adapted to act as a USB host with respect to the hard disk 22. The hard disk 22 is a bus-powered device that operates with power supplied using a USB power line (Vbus) from the USB host. The Vbus for supplying power from the digital camera 20 to the hard disk 22 corresponds to the power 13 shown in FIG. 2. This Vbus is turned ON/OFF by a switching signal from the control unit 2 within the digital camera 20, and the power supply to the hard disk 22 is controlled thereby. Hereinafter, descriptions shall be given regarding control of the power supply to the hard disk 22 performed by the digital camera 20 in such a configuration.

Next, a sequence through which the power control unit 1 supplies power to the hard disk 22 when the digital camera 20 is started up shall be described with reference to FIG. 7.

Figure 7:
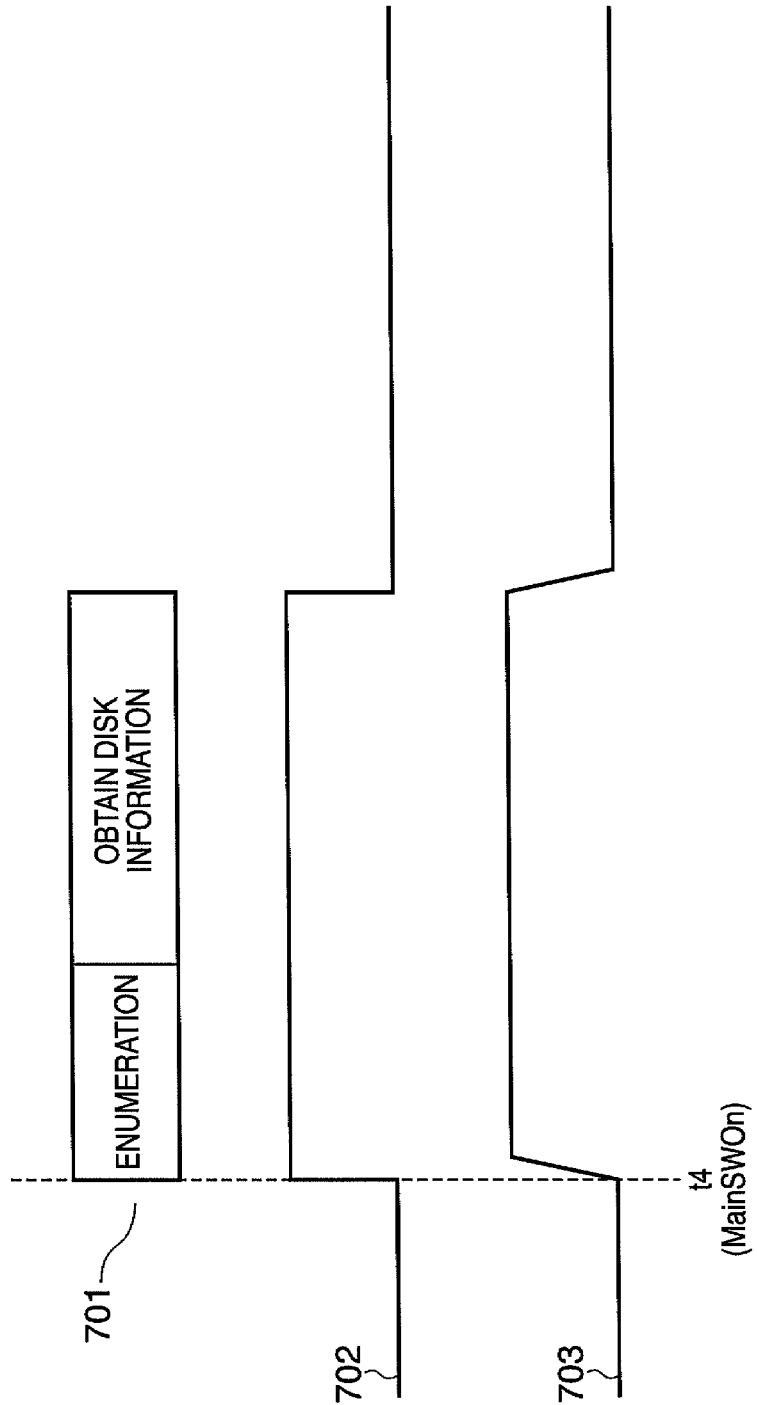
FIG. 7 is a timing diagram illustrating an example of a sequence performed when starting up the image input apparatus according to the second embodiment of the present invention.

In FIG. 7, reference numeral 701 represents operations performed with respect to the hard disk 22. Reference numeral 702 represents the waveform of a switching signal 15 from the control unit 2. With regards to 702, the LOW state indicates that a switch 14 is OFF, and that the power 13 supplied to the hard disk 22 using the Vbus is stopped. On the other hand, the HIGH state indicates that the switch 14 is ON, and that power is being supplied to the hard disk 22 using the Vbus.

Reference numeral 703 represents the operational state of the hard disk 22; the power supplied by the Vbus is controlled in accordance with a switching signal 15. Therefore, the operations of the hard disk 22 are stopped when 703 is in the LOW state pursuant to the switching signal 15 being in the LOW state, whereas the hard disk 22 is started up and is in an operational state when the switching signal 15 is in the HIGH state. When the switching signal 15 changes from the HIGH state to the LOW state, the operations of the hard disk 22 are stopped in accordance therewith, and the hard disk 22 enters a power saving mode.

The horizontal axis in FIG. 7 expresses time. At time t4, a power button provided in the operation unit 6 is manipulated, thereby turning on the main power of the digital camera 20. Simultaneous to the main power being turned on, the switching signal 15 enters the HIGH state; the power of the hard disk 22 is turned on via the Vbus, and the hard disk 22 enters an operational state.

Next, enumeration is performed, and the device information is confirmed by the control unit 2; after this, partition information, FAT and directory entry information, and the like of the hard disk 22 are read out, and the already-stored information is checked. The type of connected device, a serial number, or the like of the hard disk 22 is included in the device information as identification information for identifying the hard disk 22. This operation may be referred to as an "initialization operation". This initialization operation is an operation that is required to be carried out when the hard disk 22 is started up in order for the digital camera 20 to utilize the hard disk 22. When the initialization operation finishes, the control unit 2 changes the switching signal 15 to the LOW state, thereby stopping the supply of power by the Vbus to the hard disk 22 and putting the hard disk 22 in the power saving mode.

Next, a sequence through which the power control unit 1 supplies power to the hard disk 22 when the digital camera 20 is performing a shooting operation shall be described with reference to FIG. 8.

Figure 8:
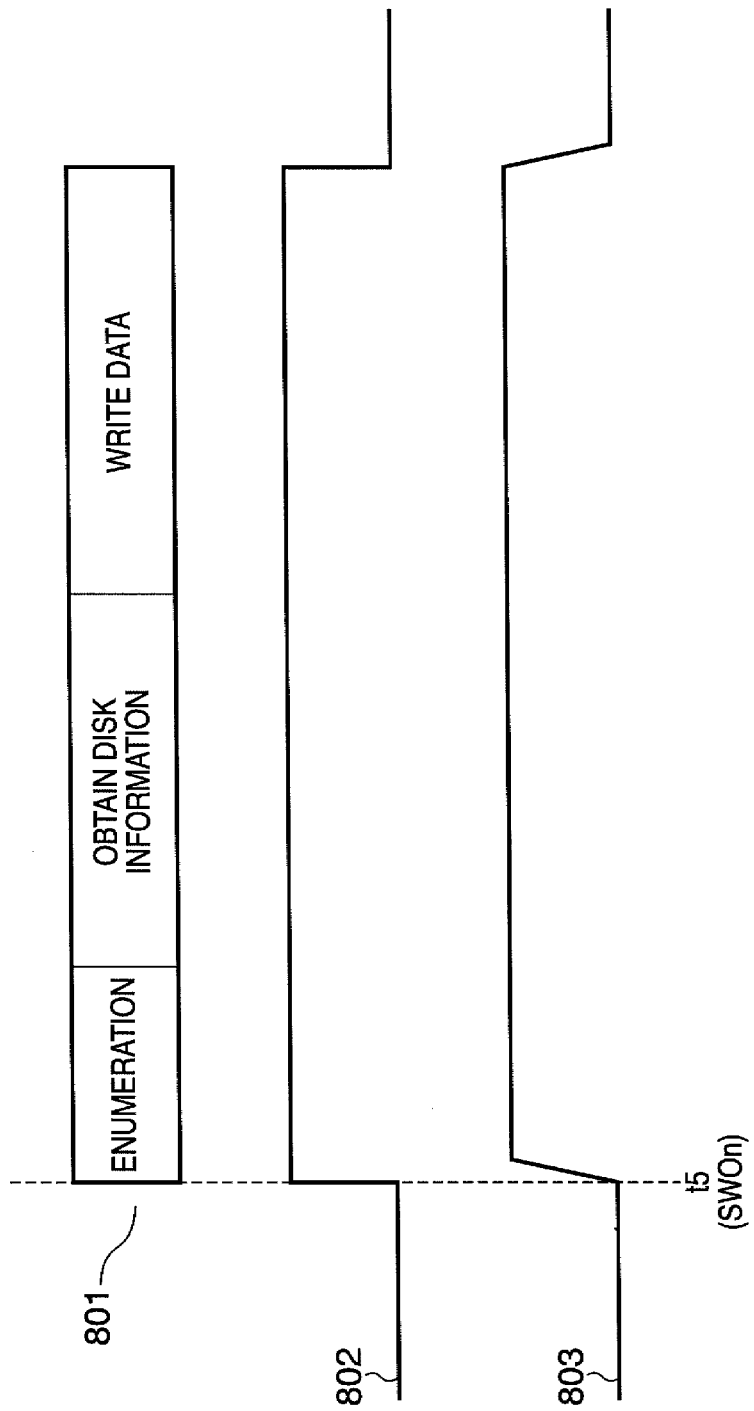
FIG. 8 is a timing diagram illustrating an example of a sequence performed during shooting operations according to the second embodiment of the present invention.

In FIG. 8, 801 represents operations performed with respect to the hard disk 22. Reference number 802 represents the waveform of the switching signal 15 from the control unit 2. With regards to 802, the LOW state indicates that the switch 14 is OFF, and that the power supplied to the hard disk 22 using the Vbus is stopped. On the other hand, the HIGH state indicates that the switch 14 is ON, and that power is being supplied to the hard disk 22 using the Vbus.

Reference number 803 represents the operational state of the hard disk 22; the power supplied by the Vbus is controlled in accordance with the switching signal 15. Therefore, the operations of the hard disk 22 are stopped when 803 is in the LOW state pursuant to the switching signal 15 being in the LOW state, whereas the hard disk 22 is started up and is in an operational state when the switching signal 15 is in the HIGH state. When the switching signal 15 changes from the HIGH state to the LOW state, the operations of the hard disk 22 are stopped in accordance therewith.

The horizontal axis in FIG. 8 expresses time. At time t5, the shutter switch provided in the operation unit 6 is manipulated so as to commence shooting operations in the image digital camera 20. In response to the shutter switch being manipulated, the switching signal 15 changes to the HIGH state; the power to the hard disk 22 is turned on in accordance therewith via the Vbus, and the hard disk 22 enters an operational state. After this, the initialization operation is performed; however, if it is determined that the device information confirmed through the initialization operation is different from the information confirmed the previous time the hard disk 22 was started up, the control unit 2 uses the display unit as a notifying unit to notify the user of the difference in the information. In this case, it can be assumed that, for example, the hard disk 22 has been exchanged for another storage device.

After this, the image data generated in accordance with the manipulation of the shutter switch is stored in the hard disk 22. When the storage of the image data finishes, the control unit 2 changes the switching signal 15 to the LOW state, thereby stopping the supply of power by the Vbus to the hard disk 22 and putting the hard disk 22 in the power saving mode. However, if the next shooting operation has commenced at the point in time when the storage of the image data has finished, the switching signal 15 is kept at the HIGH state, and newly-generated image data is stored.

Next, a sequence through which the power control unit 1 supplies power to the hard disk 22 when the digital camera 20 is executing a play back of image data shall be described with reference to FIG. 9.

Figure 9:
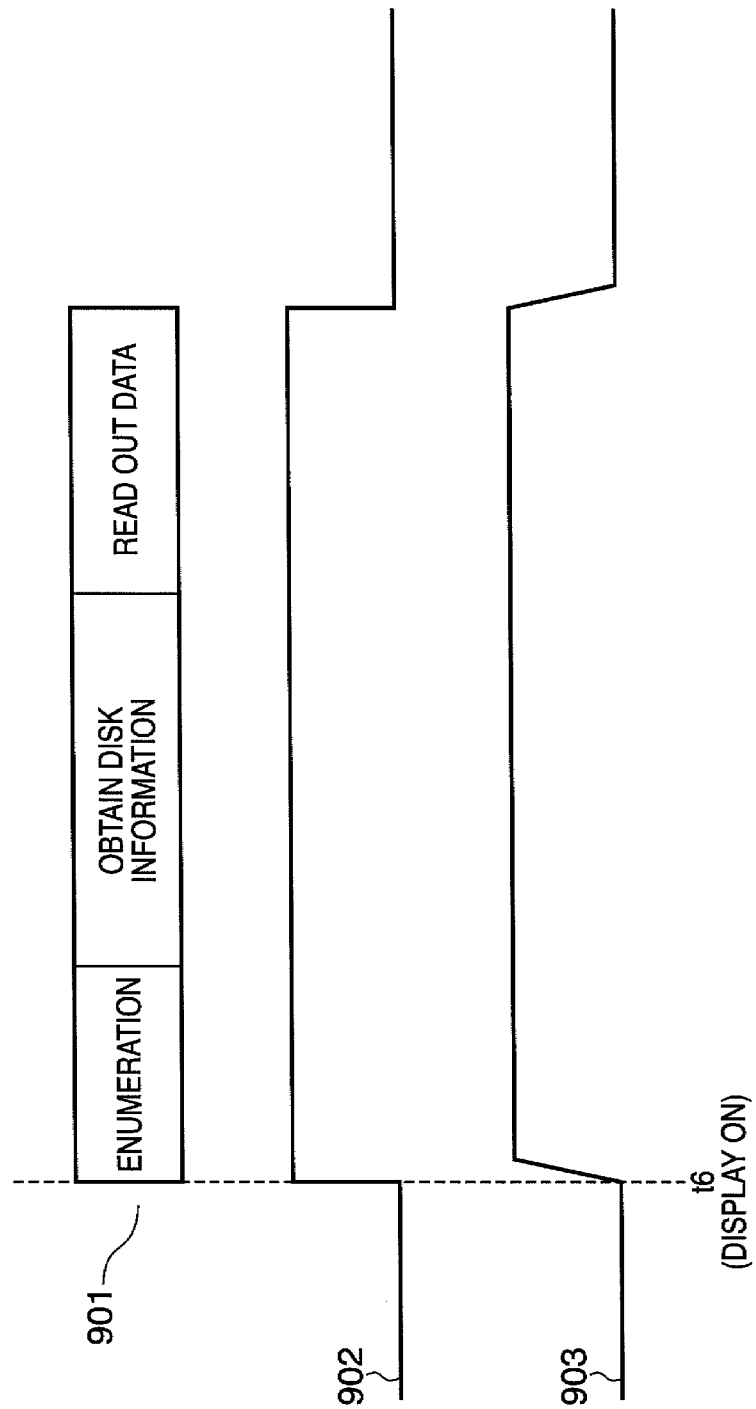
FIG. 9 is a timing diagram illustrating an example of a sequence performed during image play back according to the second embodiment of the present invention.

In FIG. 9, 901 represents operations performed with respect to the hard disk 22. Reference number 902 represents the waveform of the switching signal 15 from the control unit 2. With regards to 902, the LOW state indicates that the switch 14 is OFF, and that the power supplied to the hard disk 22 using the Vbus is stopped. On the other hand, the HIGH state indicates that the switch 14 is ON, and that power is being supplied to the hard disk 22 using the Vbus.

Reference number 903 represents the operational state of the hard disk 22; the power supplied by the Vbus is controlled in accordance with the switching signal 15. Therefore, the operations of the hard disk 22 are stopped when 903 is in the LOW state pursuant to the switching signal 15 being in the LOW state, whereas the hard disk 22 is started up and is in an operational state when the switching signal 15 is in the HIGH state. When the switching signal 15 changes from the HIGH state to the LOW state, the operations of the hard disk 22 are stopped in accordance therewith, and the hard disk 22 enters a power saving mode.

The horizontal axis in FIG. 9 expresses time. At time t6, the play back button provided in the operation unit 6 is manipulated so as to commence operations for executing a play back of image data stored in the hard disk 22. In response to the play back button being manipulated, the switching signal 15 changes to the HIGH state; the power to the hard disk 22 is turned on in accordance therewith via the Vbus, and the hard disk 22 enters an operational state. After this, the initialization operation is performed; however, if it is determined that the device information confirmed through the initialization operation is different from the information confirmed the previous time the hard disk 22 was started up, the control unit 2 uses the display unit as a notifying unit to notify the user of the difference in the information. In this case, it can be assumed that, for example, the hard disk 22 has been exchanged for another storage device.

After this, the image data read out from the hard disk 22 in response to the button being manipulated is supplied to the image processing unit 3, and is played back/displayed on the display unit. When the play back of the image data finishes, the control unit 2 changes the switching signal 15 to the LOW state, thereby stopping the supply of power via the Vbus to the hard disk 22 and putting the hard disk 22 in the power saving mode. However, if the next button manipulation for executing a play back of image data has been commenced at the point in time when play back of the image data has finished, the switching signal 15 is kept at the HIGH state, and the play back of the image data is executed.

By controlling the supply of power to the hard disk 22 via the Vbus in accordance with the abovementioned sequence, the digital camera 20 can be equipped with the hard disk 22, which functions as a storage device 5, thereby realizing the image input apparatus 100.

Therefore, as described above, the power of the image input apparatus can be used in an effective manner by performing control to supply power to the storage device only when the storage device needs to be accessed, even when an external storage device is being used. This also makes it possible to equip the image input apparatus with a storage device having a large capacity and a high rate of energy consumption, such as a hard disk.

Finally, using the manipulations for commencing shooting operations and the manipulations for commencing play back operations in order to commence the supply of power to the storage device makes it possible to manage the operations of an image input apparatus such as a digital camera with ease.

Third Exemplary Embodiment

Next, operations performed by an image input apparatus 100 when coming out of a power saving mode shall be described as a third embodiment of the present invention. A function block diagram of an interchangeable lens-type digital camera according to the third embodiment of the present invention is the same as that shown in FIG. 1B, and thus descriptions thereof shall be omitted here.

However, in the example described in the present embodiment, a storage medium portion 203 implemented by a magnetic disk such as a hard disk is connected externally to the image input apparatus 100 using a USB connection. In this case, a control unit 202 has a device controller for implementing USB-connected device functionality in a storage medium 200. A connector 201 on the storage medium 200 side and a connector 124 on the image input apparatus 100 side are both configured as connectors capable of being connected via a USB cable (not shown), and the connector 201 and connector 124 are connected via a USB cable. Also, a control unit 123 on the image input apparatus 100 side is capable of communicating with the control unit 202 on the storage medium 200 side, and is capable of supplying power to the storage medium 200, via a USB cable.

FIGS. 10 to 15 are diagrams illustrating operations of the image input apparatus 100 corresponding to the present embodiment. Here, the processes in FIGS. 10 to 15 are carried out through processing programs stored in a predetermined storage area (a ROM, hard disk, or the like) being loaded into a RAM and executed by the CPU of a microcomputer 127 shown in FIG. 1B.

[Exemplary Main Sequence]

Figure 10:
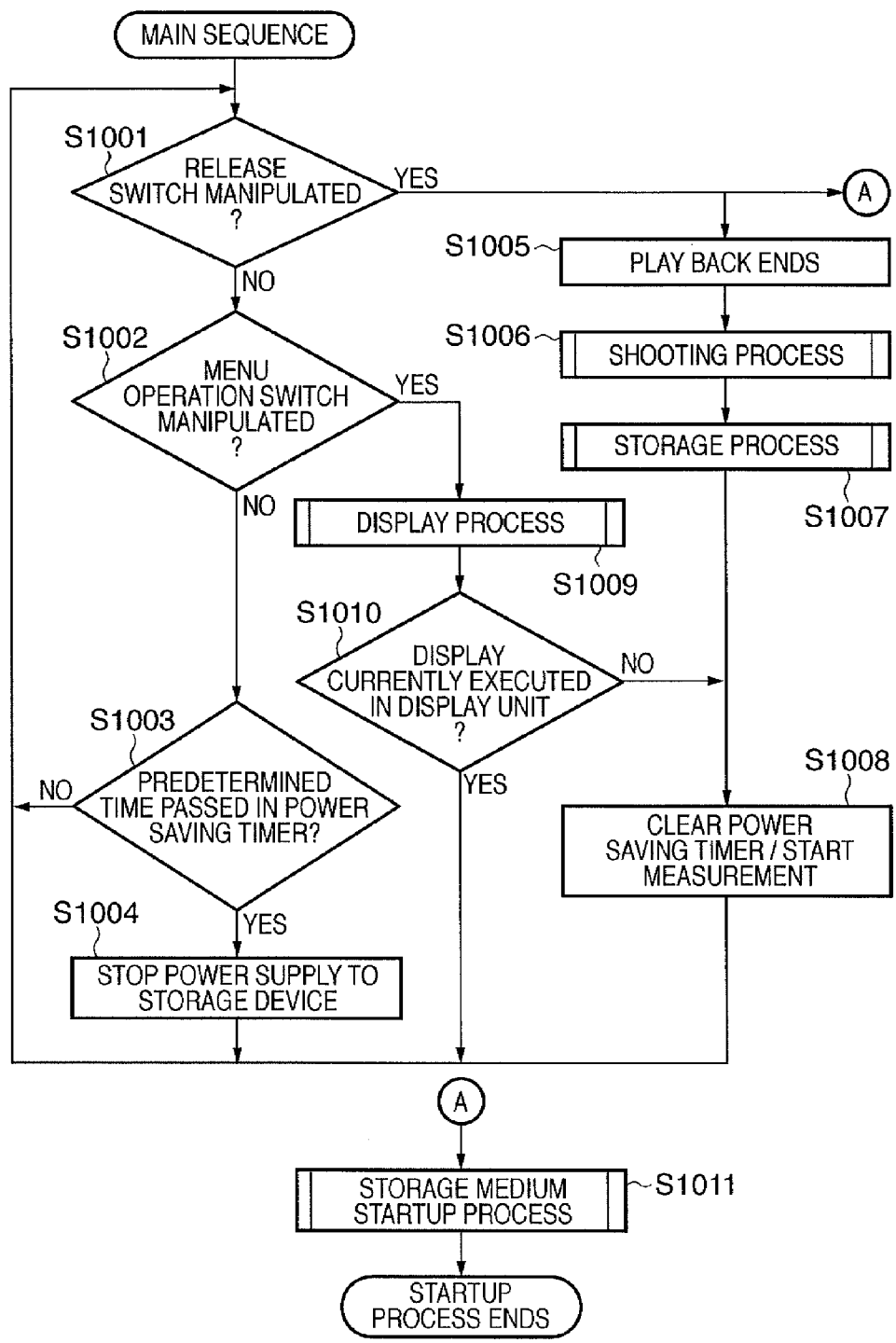
FIG. 10 is a flowchart illustrating a main sequence of operations of an image input apparatus.

FIG. 10 is a flowchart illustrating a main sequence of operations of the image input apparatus 100. FIG. 10 specifically illustrates a series of processes from shooting to storage and display processing, as well as a sequence for a power saving mode of the storage medium 200. Note that the state where power is being supplied to the storage medium 200 is called a "normal mode". Furthermore, each process in FIG. 10 is executed under a multitask configuration.

First, in Step S1001, it is determined whether or not an SW1 has been manipulated and turned on by a release switch 120 being depressed halfway, thereby instructing shooting operations to be commenced. If the SW1 has not been manipulated, the procedure moves to Step S1002. In Step S1002, it is determined whether or not a menu operation switch 121 has been manipulated, thereby instructing a display unit 110 to perform a display; if the menu operation switch 121 has not been manipulated, the procedure moves to Step S1003.

In Step S1003, it is determined whether or not a power saving timer has counted a predetermined amount of time. Here, the power saving timer measures the amount of time that has passed in a state where the storage medium 200 has not been accessed, where, with respect to the image input apparatus 100, the release switch 120 has not instructed shooting to be performed, the menu operation switch 121 has not instructed a display to be performed, and so on.

If in Step S1003, it is determined that the predetermined amount of time as counted by the power saving timer has not passed, the sequence from Step S1001 is repeated. However, if in Step S1003 it is determined that the predetermined amount of time as counted by the power saving timer has passed, the procedure moves to Step S1004, and the storage medium 200 is put into the power saving mode. Note that the storage medium 200 is kept in the power saving mode if it is already in the power saving mode. In the power saving mode, the power supply to the storage medium 200 is stopped, and the operations of the storage medium 200 are stopped as well. Note that the power supply to the storage medium 200 can be stopped at the point in time when the storage of image data, the play back of image data, or the like finishes, as per the second embodiment, rather than using the power saving timer.

In the present embodiment as well, the power saving mode of the storage medium 200 can be operated independently of a power saving mode of the image input apparatus 100. In other words, even if the image input apparatus 100 is being used, it is nevertheless possible to put only the storage medium 200 in the power saving mode, effectively reducing the amount of power consumed by the system as a whole.

Next, if in Step S1001 the SW1 has been manipulated and turned on by a release switch 120 being depressed halfway, thereby instructing shooting operations to be commenced, in Step S1011, a startup process for the storage medium 200 is instructed to be performed in accordance with the state thereof. A sequence illustrating the startup process for the storage medium 200 shall be described later with reference to FIG. 12.

When the storage medium 200 is instructed to be started up in Step S1011, the procedure moves to Step S1005 without waiting for the startup process of the storage medium 200 to finish, and if a display is being executed through the display unit 110, that display is ended. Next, the procedure moves to Step S1006, where the shooting process is executed. In other words, the startup process of the storage medium 200 and the shooting process are executed in parallel. The shooting process shall be described later with reference to FIG. 11.

When the shooting process in Step S1006 finishes, the procedure moves to Step S1007, where a storage process for storing an image file created in the shooting process in the storage medium 200 is carried out. The storage process shall be described later with reference to FIG. 12. When the storage process finishes, the procedure moves to Step S1008, where the power saving timer is reset and measurement of the predetermined amount of time begins again.

It is noted that it takes between several and ten seconds from when power is supplied to the storage medium 200 to when the storage medium 200 enters the write-capable normal mode in the case where the storage medium 200 is an external storage medium connected via USB, as in the present embodiment. However, the processes are executed in parallel under the control of the multitask configuration, and thus in the present configuration, the shooting process is repeatedly executed regardless of whether or not the storage medium 200 is started up.

Next, if it has been determined in Step S1002 that the menu operation switch 121 has been manipulated, thereby instructing a display to be performed on the display unit 110, the procedure moves to Step S1009, and a display process is executed. The display process shall be described later with reference to FIG. 15. When the display process in Step S1009 finishes, the procedure moves to Step S1010, where the state of the display unit 110 is confirmed.

If image data is being played back/displayed or menu items are being displayed on the display unit 110 in Step S1010, the procedure returns to Step S1001, and the sequence is repeated. If, however, there is nothing being displayed on the display unit 110 in Step S1010, the procedure moves to Step S1008, where the power saving timer is reset and measurement of the predetermined amount of time begins again.

[Exemplary Shooting Process]

Figure 11:
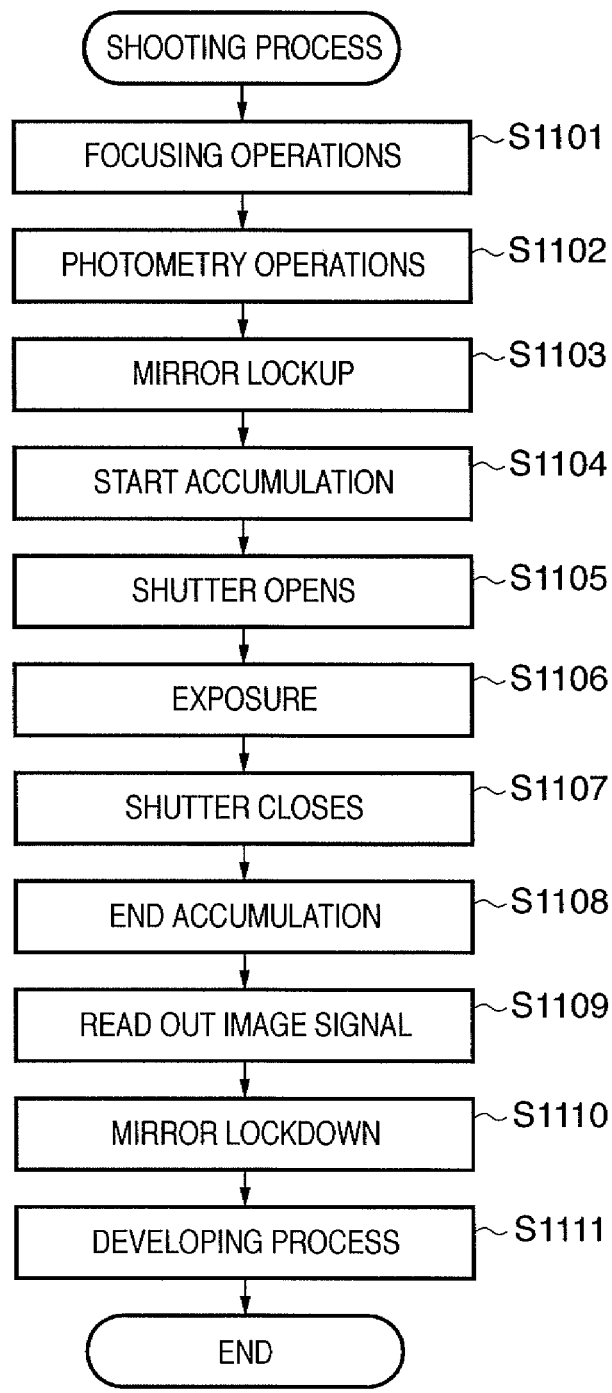
FIG. 11 is a flowchart illustrating the shooting process indicated by Step S1006 of FIG. 10.

Next, the shooting process indicated by Step S1006 of FIG. 10 shall be described with reference to FIG. 11.

When SW1 is depressed by the menu operation switch 121 being manipulated, and the shooting process is executed, auto-focus control is carried out by a focusing circuit 117 and a lens control circuit 101a, controlling the point of focus and thereby bringing the focusing lens into focus, in Step S1101.

Next, in Step S1102, photometry operations are performed by a photometry circuit 118, and a shutter control value and aperture to be controlled are determined in accordance with the set shooting mode. Then, in Step S1103, mirror lockup is executed by providing an instruction to a mirror control circuit 116, causing a quick-return mirror 102 to move out of the optical path for shooting; then, in Step S1004, an accumulation process by the image capturing device 105 commences.

In Step S1105, an instruction is provided to a shutter control circuit 115, releasing the shutter, and exposing the image capturing device 105 (Step S1106). Next, in Step S1107, an instruction is provided to the shutter control circuit 115, closing the shutter, and in Step S1108, the accumulation process by the image capturing device 105 ends.

Next, in Step S1109, an image signal is read out from the image capturing device 105, and the resulting image data processed by an A/D converter 106 and an image processing circuit 107 is temporarily stored in a memory 113. Then, when the entirety of the image signal has been read out from the image capturing device 105, mirror lockdown is executed by providing an instruction to the mirror control circuit 116, causing the quick-return mirror 102 to return into the optical path for shooting, in Step S1110. Finally, in Step S1111, image data, resulting from a predetermined developing process being performed on the image signal, is created, and the shooting process ends.

[Exemplary Storage Process]

Figure 12:
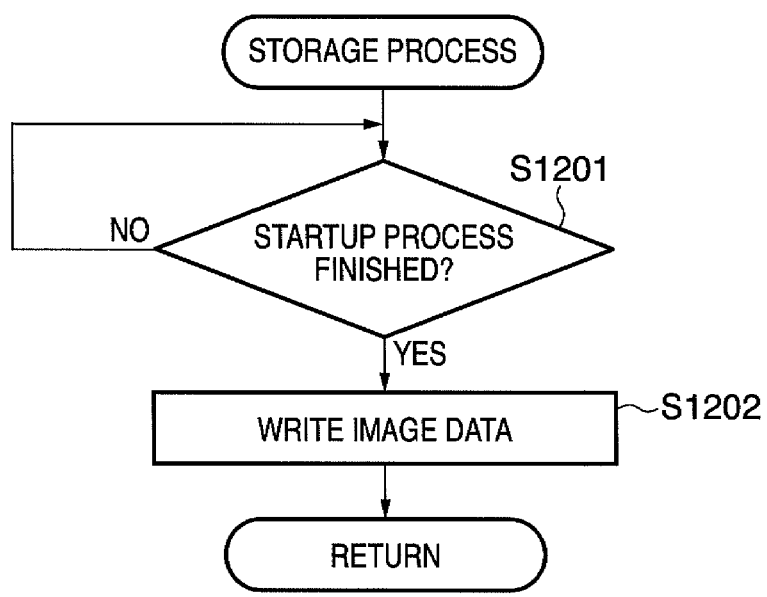
FIG. 12 is a flowchart illustrating the storage process indicated by Step S1007 of FIG. 10.

Next, the storage process indicated by Step S1007 of FIG. 10 shall be described with reference to FIG. 12.

First, in Step S1201, it is determined whether the startup process has been completed, or in other words, whether the storage medium 200 has come out of the power saving mode and writing to the storage medium 200 is possible. If in Step S1201 the startup process has not been completed, the system stands by until the startup process is completed. If in Step S1201 the startup process is complete and the storage medium 200 is in the normal mode, the procedure moves to Step S1201. In Step S1202, the image data temporarily stored in the memory 113 is written into the storage medium 200 under a hierarchical folder structure compliant with a predetermined rule thereof, and is stored in the storage medium 200 thereby; after this, the storage process ends.

[Exemplary Storage Medium Startup Process]

Figure 13:
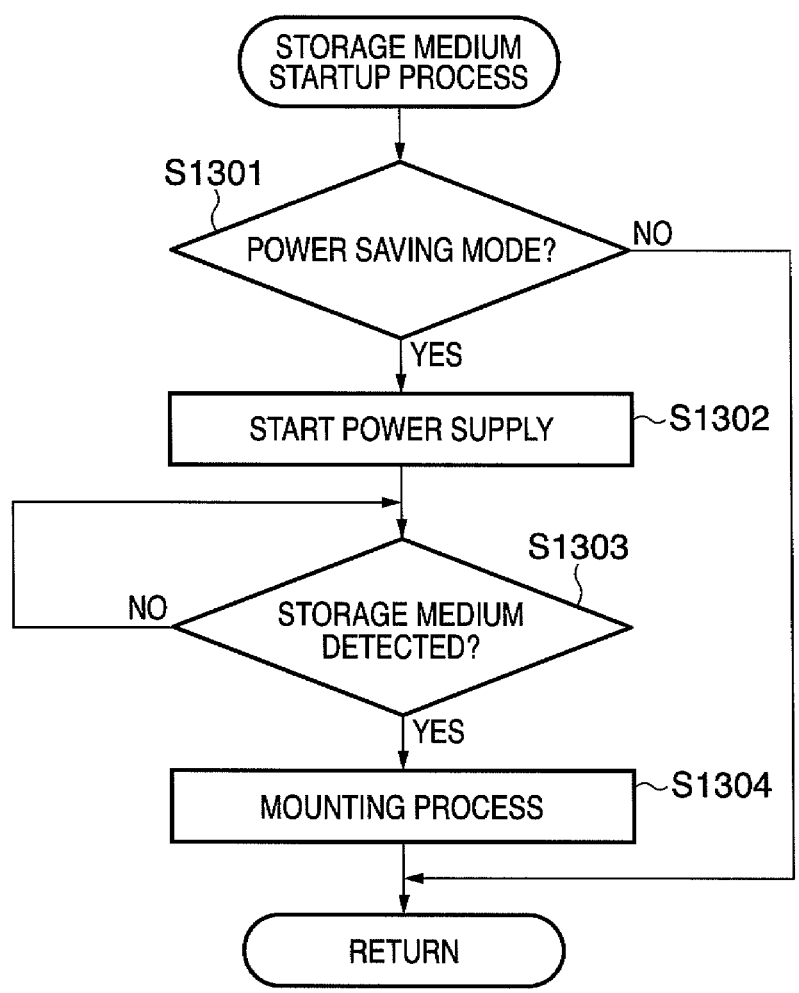
FIG. 13 is a flowchart illustrating a storage medium startup process (Step S1011 in FIG. 10) in which a storage medium is restored to a functional normal mode from a power saving mode.
Figure 14:
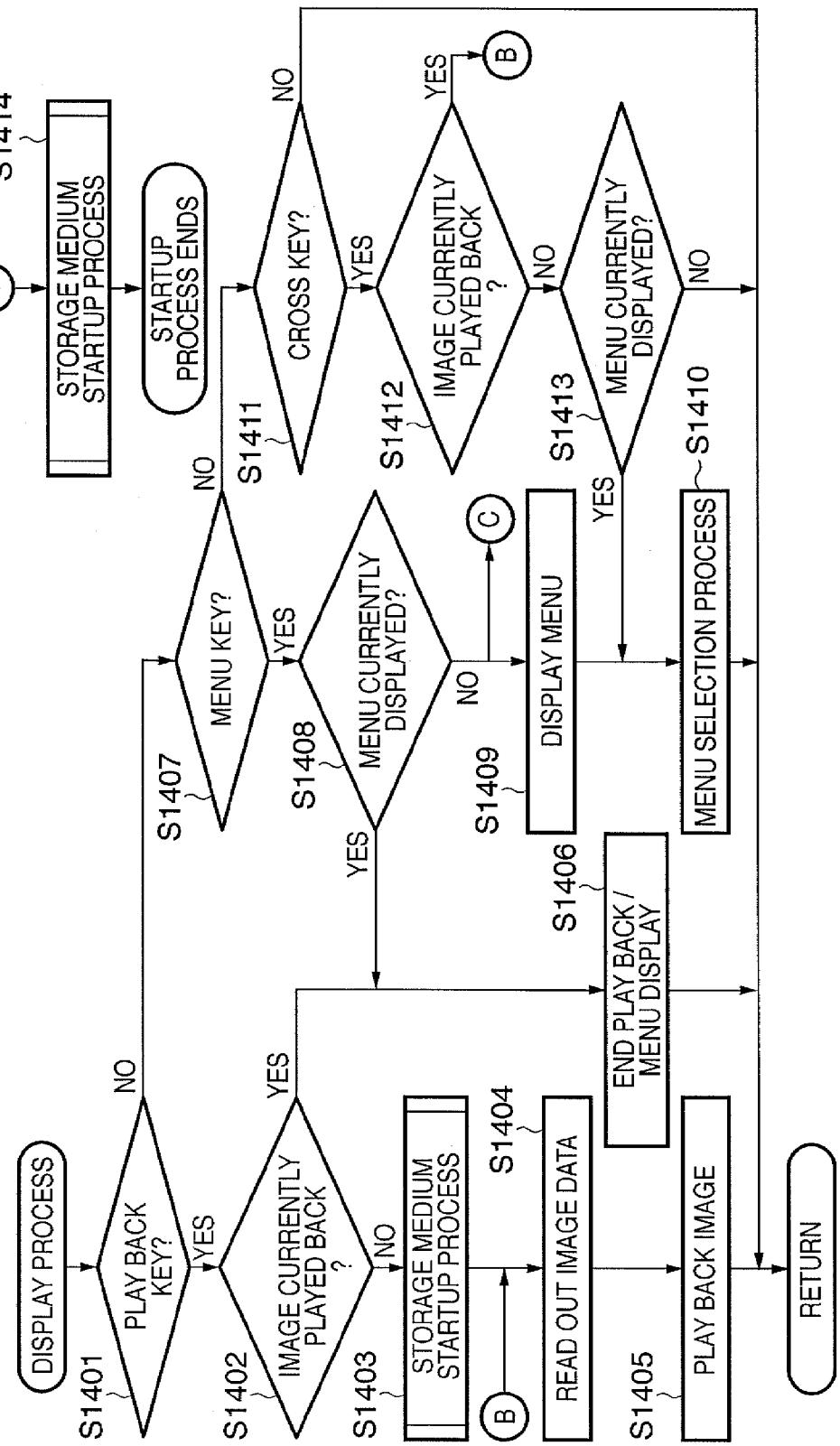
FIG. 14 is a flowchart illustrating a process for reading out image data stored in a storage medium and playing back the image data in a display unit, a process for displaying setting menu items, and so on (Step S1009 in FIG. 10).

Next, a storage medium startup process (Step S1011 in FIG. 10), in which a storage medium 200 is restored to a functional normal mode from a power saving mode, shall be described with reference to FIG. 13.

First, in Step S1301, it is determined whether or not the storage medium 200 is in the power saving mode. If in Step S1301 the storage medium 200 is not in the power saving mode, it is assumed that the storage medium 200 is already in the normal mode and that a mounting process, which makes it possible to write into the storage medium 200, has been completed; this state is maintained, and the startup process for the storage medium 200 finishes. However, if in Step S1301 the storage medium 200 is in the power saving mode, the procedure moves to Step S1302, where the power supply to the storage medium 200 is started, and the connection with the storage medium 200 is detected (Step S1303).

When the connection with the storage medium 200 is detected in Step S1303, the procedure moves to Step S1304, where a known mounting process, which makes it possible to write into the storage medium 200, is carried out, after which the storage medium startup process finishes.

In such a manner, in the present embodiment, the startup process for the storage medium 200 is commenced in accordance with manipulation of the release switch 120 prior to the storage process, and the startup process is executed in parallel with the shooting process. For this reason, the amount of time required before data can be written into the storage medium can be reduced, as compared to the case where the storage medium 200 is started up at the point in time when writing to the storage medium 200 has become necessary.

[Exemplary Display Process]

Next, a process for reading out image data stored in a storage medium 200 and executing a play back of the image data in a display unit 110, a process for displaying setting menu items, and so on (Step S1009 in FIG. 10), shall be described with reference to FIG. 15. A display process of the display unit 110 is executed when a play back key or a menu key provided in the menu operation switch 121 is manipulated. The "display process of the display unit 110" includes the play back of image data, the display of setting menu items, and so on.

First, in Step S1401, it is determined whether or not the play back key has been manipulated. If in Step S1401 the play back key has been manipulated, the procedure moves to Step S1402, where it is determined whether or not an image is currently being played back. If in Step S1402 an image is not currently being played back, the procedure moves to Step S1403, where the startup process for the storage medium 200 is executed. The procedure moves to Step S1404 when the startup process finishes.

In Step S1404, the image data is read out from the storage medium 200 to the image display memory 112, and in Step S1405, a display control circuit 109 is controlled, thereby play back/displaying the image data on the display unit 110, and executing a play back of the image data. When the play back finishes, the display process finishes while maintaining the state of play back.

If in Step S1402 an image is currently being played back, the procedure moves to Step S1406, where the image play back on the display unit 110 finishes and the series of display processes ends. In other words, the display process is continued while the image is being played back on the display unit 110.

Next, if in Step S1401 it has been determined that the play back key has not been manipulated, the procedure moves to Step S1407, where it is determined whether or not the menu key has been manipulated. If the menu key has been manipulated, the procedure moves to Step S1408, where it is determined whether a menu is currently being displayed; if the menu is not currently being displayed, the procedure moves to Step S1409, where the menu is displayed. Next, in Step S1410, processing is performed in accordance with menu selection operations. Otherwise, if the menu is currently being displayed, the storage medium startup process is performed at S1414.

With the menu selection operations, it is possible to select a desired item by manipulating a cross key and a set key, and setting processes are executed in accordance with the selected menu item. Processes to be performed on the image data stored in the storage medium 200, such as, for example, rotation, specification of images to be printed, and so on are included in the menu items. In this case, files within the storage medium 200 are processed, and thus the process is executed after waiting for the storage medium 200 to start up. When the menu selection process finishes, the display process ends.

If in Step S1408 the menu is currently being displayed, the procedure moves to Step S1406, where the menu display on the display unit 110 finishes and the series of display processes ends. In other words, the display process is continued while the menu is being played back on the display unit 110.

If in Step S1407 it is determined that the menu key has not been manipulated, the procedure moves to Step S1411, where it is determined whether or not the cross key has been manipulated. If the cross key has been manipulated, the procedure moves to Step S1412, where it is determined whether or not an image is currently being played back. If an image is currently being played back, the procedure moves to Step S1404, where one of the images previous or subsequent to the currently played back/displayed image is read out and played back in accordance with the manipulation of the cross key.

If in Step S1412 it is determined that an image is not currently being played back, the procedure moves to Step S1413, where it is determined whether or not the menu is currently being displayed. If the menu is currently being displayed, the procedure moves to Step S1410, where the microcomputer 127 executes a process for menu selection operations. If in Step S1411 it is determined that the cross key has not been manipulated, the series of display processes ends.

In such a manner, in the present embodiment, once the display process has been started, the display process is continued until an operation for ending the display process is performed. While the display process is continued, the power saving mode of the storage medium 200 is stopped, and the normal mode is maintained. In other words, the storage medium 200 is prohibited from entering the power saving mode when images are being repeatedly played back, menu selection operations are being repeatedly performed, and so on. For this reason, there is no need to, for example, play back an image, enter power saving mode, accept a cross key manipulation, wait for the startup process to finish, read out an image, and play back the image, each time an operation for selecting an image to play back is performed by manipulating the cross key (S1411, S1412); in other words, there is no need to wait for the storage medium 200 to start up with each play back. The same applies to the menu selection process.

As described thus far, in the present embodiment, the storage medium 200 is controlled so as to enter the power saving mode when the storage medium 200 has not been accessed for a predetermined amount of time. This makes it possible to effectively suppress the amount of power consumed by the system as a whole.

Furthermore, when the storage medium 200 is in the power saving mode, the startup process is executed for the storage medium 200 in accordance with instructions for commencing shooting operations. This makes it possible to prevent delays in the process for storing image data caused by late startup of the storage medium 200.

Furthermore, the startup process is executed for the storage medium 200 in accordance with instructions for commencing play back operations. This makes it possible to prevent delays in reading out image data from within the storage medium 200, processes for changing image data, access to the storage medium 200, and so on, caused by late startup of the storage medium 200.

Further still, startup of the power saving mode of the storage medium 200 is controlled in accordance with the state of the display unit 110. In other words, when image data, menu items, or the like are being displayed on the display unit 110, it is highly likely that the storage medium 200 will be accessed, and thus the power saving mode is stopped and the normal mode is maintained. This makes it possible to prevent delays in reading out image data from within the storage medium 200, processes for changing image data, access to the storage medium 200, and so on, caused by late startup of the storage medium 200, such as when repeatedly selecting/displaying images.

In this manner, in the present embodiment, the storage medium 200 is started up from the power saving mode in accordance with shooting operations, play back operations, and so on, eliminating the need for the user to concern him/herself with power saving operations, and making it possible to enter the power saving mode automatically. Therefore, it is possible to achieve both a reduction in power consumption and an improvement in operability in the digital camera by appropriately controlling switches from the normal mode to the power saving mode and from the power saving mode to the normal mode.

Note that while a USB-connected HDD has been given as an example of the storage medium in the present embodiment, other types of connections and other storage mediums, such as, for example, an optical disk, may be used instead.

Fourth Exemplary Embodiment

Next, a digital camera according to a fourth embodiment of the present invention shall be described with reference to FIGS. 15 to 19. FIG. 15 is a function block diagram of an interchangeable lens-type digital camera according to the fourth embodiment of the present invention. Note that elements that overlap with, and are similar thereto, or are equivalent to those in FIG. 1B shall be given identical reference numerals. Thus, descriptions thereof shall be omitted.

As shown in FIG. 15, an image input apparatus 100 according to the present embodiment adds a control unit 125, which controls a storage medium 300, and a connector 126, which connects with the storage medium 300, to the configuration shown in FIG. 1B. In the present embodiment, a storage medium 200 is assumed to be a magnetic disk, while the storage medium 300 is assumed to be a memory card or the like. The storage medium 300 includes a storage medium portion 213, which is configured of a semiconductor memory, a control unit 212 that serves as an interface with the image input apparatus 100 and controls the storage medium portion 213, and a connector 211 that connects to the connector 126 on the image input apparatus 100 side.

Note that the configuration used here may have the storage medium 300 disposed entirely within the housing of the image input apparatus 100, or may have the storage medium 300 external to the image input apparatus 100, connected thereto via a cable or the like. However, the configuration of the present embodiment has the storage medium 300 disposed entirely within the image input apparatus 100. On the other hand, the storage medium 200 is an HDD serving as an external storage medium connected via USB and disposed outside of the housing of the image input apparatus 100, in the same manner as in the third embodiment.

Also, a control unit 123 on the image input apparatus 100 side is capable of communicating with the control unit 202 on the storage medium 200 side, and is capable of supplying power to the storage medium 200, via a USB cable; furthermore, a power saving mode that stops the power supply to only the storage medium 200 can be implemented.

There are situations in the following descriptions where the storage medium 200 is referred to as an HDD 200, and the storage medium 300 is referred to as a memory card 300. Furthermore, the user can specify which storage medium to store image data in from among the HDD 200 and the memory card 300, and the recording medium specified by the user is referred to as the "current medium".

Figure 16A:
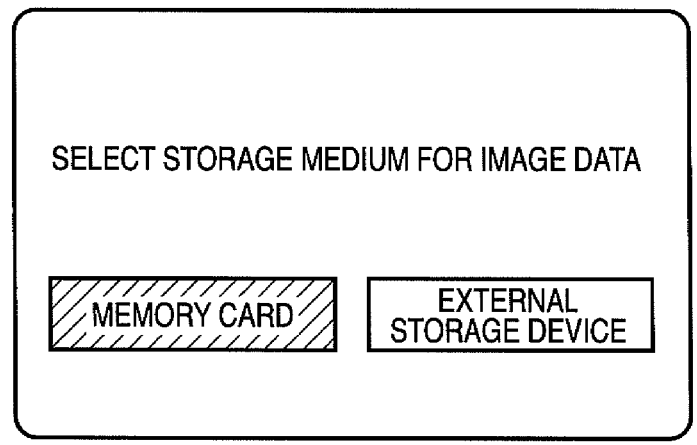
FIG. 16A is a diagram illustrating a state in which menu items for specifying a storage medium are displayed in a display unit.
Figure 16B:
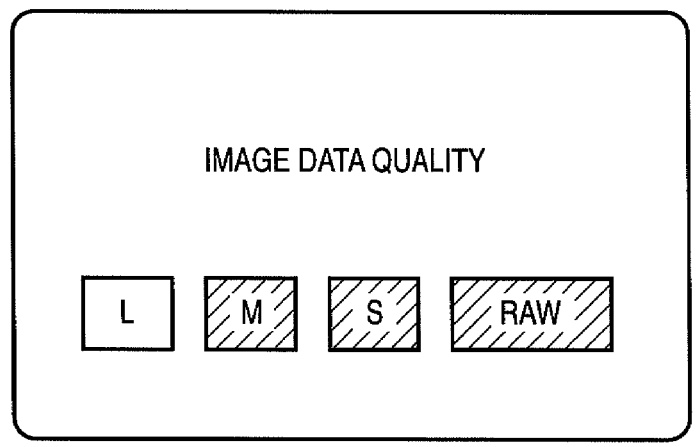
FIG. 16B is a diagram illustrating a state in which menu items for specifying a storage medium are displayed in a display unit.

The user performs a specification operation in order to specify the storage medium into which the image data is to be stored. FIGS. 16A and 16B are diagrams illustrating a state in which menu items for specifying a storage medium are displayed on the display unit 110. The user selects, from among the selection items, "memory card", which specifies the memory card 300 is to be the current medium, or "external storage device", which specifies the HDD 200 is to be the current medium.

The following descriptions assume that the HDD 200 has been selected as the current medium. First, using the selection menu for the image data storage medium shown in FIG. 16A, "external storage device" is selected, and then, using the menu in FIG. 16B, the quality of the image data to be saved in the "external storage device" is selected. As the quality of image data, it is possible to specify "L", "M", and "S", which indicate differently-sized and compressed JPEG data developed by the image processing circuit 107, as well as "RAW", which indicates raw data from the image capturing device 105 prior to developing processing.

Figure 18:
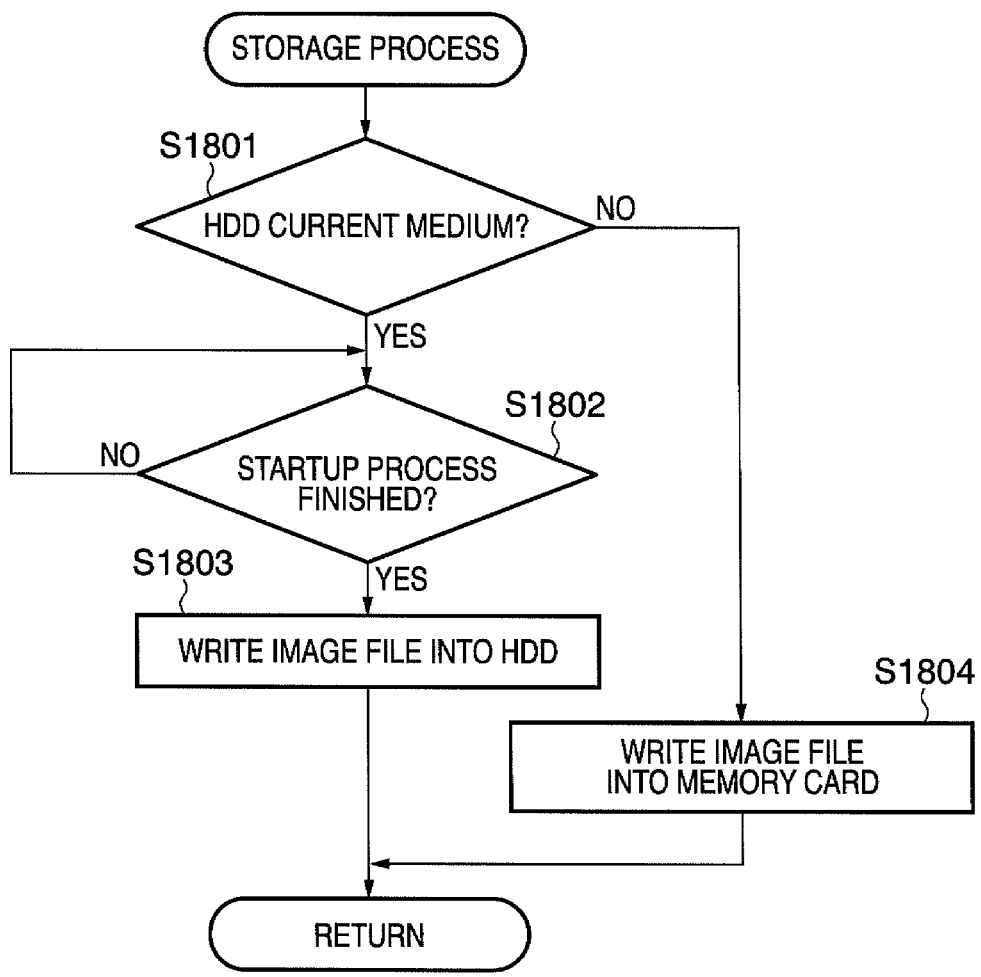
FIG. 18 is a flowchart illustrating a process for storing image data created through a shooting process in a storage medium (Step S1707 in FIG. 17).
Figure 19:
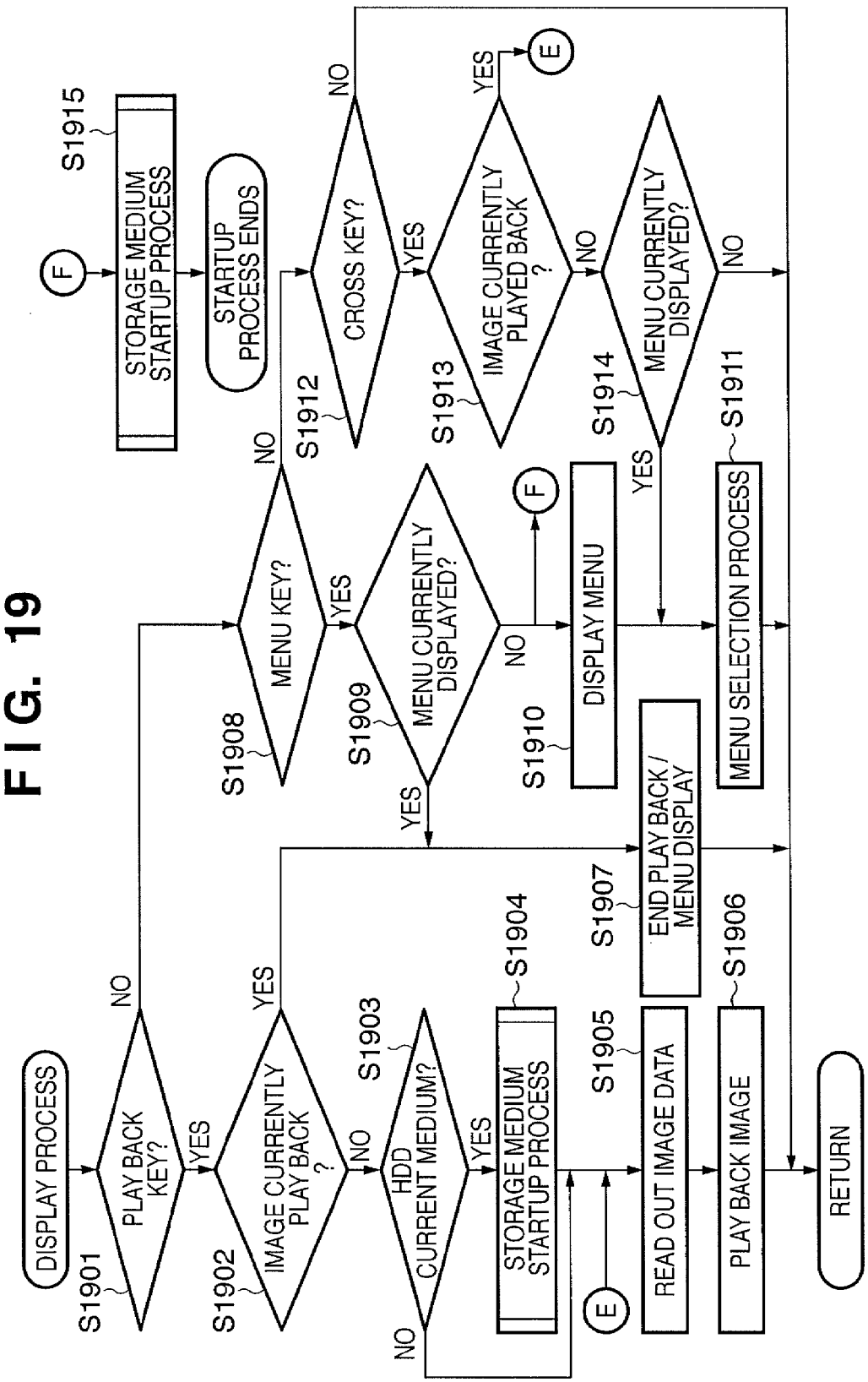
FIG. 19 is a flowchart illustrating a process for reading out image data stored in a storage medium and playing back the image data in a display unit, a process for displaying setting menu items, and so on (Step S1710 in FIG. 17).

Next, an example of operations of the image input apparatus 100 configured as above shall be described with reference to FIGS. 17 to 19. Here, the processes in FIGS. 17 to 19 are carried out through processing programs stored in a predetermined storage area (a ROM, hard disk, or the like) being loaded into a RAM and executed by the CPU of a microcomputer 127.

[Exemplary Main Sequence]

Figure 17:
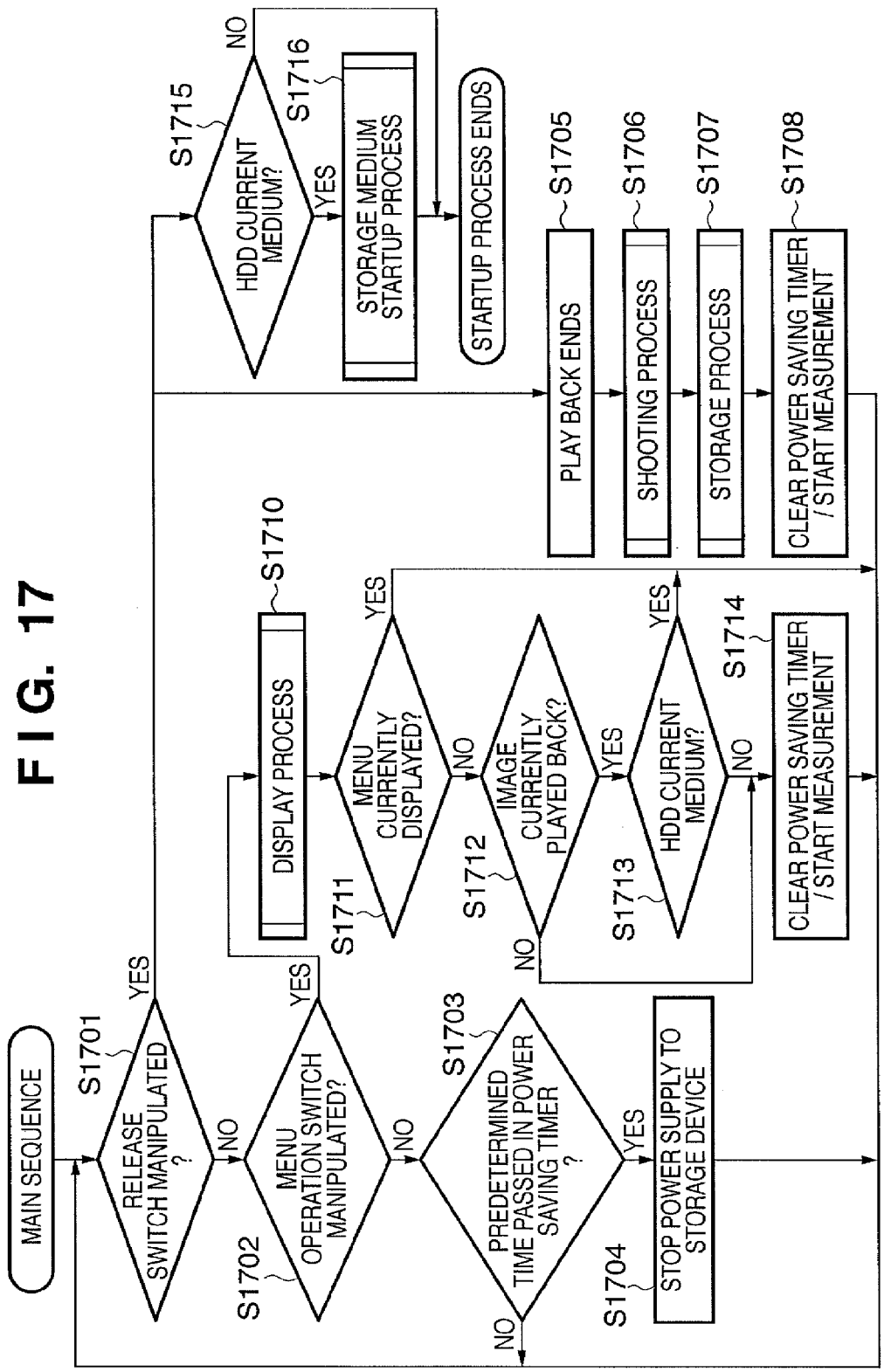
FIG. 17 is a flowchart illustrating a main sequence of operations of an image input apparatus.

FIG. 17 is a flowchart illustrating a main sequence performed by the digital camera according to the present embodiment, and specifically illustrates a series of processes from shooting to storage and display processing, as well as a sequence for a power saving mode of the HDD 200. Note that each process in FIG. 17 is executed under a multitask configuration.

First, in Step S1701, it is determined whether or not an SW1 has been manipulated and turned on by a release switch 120 being depressed halfway, thereby instructing shooting operations to be commenced. If the SW1 has not been manipulated, the procedure moves to Step S1702, where it is determined if a menu operation switch 121 has been manipulated, thereby instructing a display to be performed on the display unit 110. Note that the menu operation switch 121 as mentioned here refers to a play back switch, and the manipulation thereof is determined. In other words, it is determined whether or not image data within the storage medium has been instructed to be played back. If the menu operation switch 121 has not been manipulated, the procedure moves to Step S1703.

In Step S1703, it is determined whether or not a power saving timer has counted a predetermined amount of time. Here, the power saving timer measures the amount of time that has passed in a state where the HDD 200 has not been accessed, where operational instructions have not been made by the release switch 120, the menu operation switch 121, or the like with regard to the digital camera. If in Step S1703 it is determined that the predetermined amount of time as counted by the power saving timer has not passed, the sequence from Step S1701 is repeated.

However, if in Step S1703 it is determined that the predetermined amount of time as counted by the power saving timer has passed, the procedure moves to Step S1704, and the HDD 200 is put into the power saving mode. Note that the HDD 200 is kept in the power saving mode if it is already in the power saving mode. In the power saving mode, the power supply to the HDD 200 is stopped, and the operations of the HDD 200 are stopped as well. In the present embodiment, the power saving mode of the HDD 200 can be operated independently of a power saving mode of the image input apparatus 100. In other words, even if the image input apparatus 100 is being used, it is nevertheless possible to put only the HDD 200 in the power saving mode, effectively reducing the amount of power consumed by the system as a whole. Note that the power supply to the HDD 200 can be stopped at the point in time when the storage of image data, the play back of image data, or the like finishes, as per the second embodiment, rather than using the power saving timer.

Next, if in Step S1701 the SW1 has been manipulated and turned on by the release switch 120 being depressed halfway, thereby instructing shooting operations to be commenced, the specification of the current medium is determined (Step S1715), and a startup process for the HDD 200 is instructed to be performed in accordance with the results of the determination (Step S1716). A sequence illustrating the startup process for the HDD 200 is identical to that described above in the third embodiment, and thus descriptions thereof shall be omitted.

If in Step S1716 the startup of the HDD 200 has been instructed, the procedure moves to Step S1705, without waiting for the startup process of the HDD 200 to finish; if a display is being carried out by the display unit 110, that display is stopped. Next, the procedure moves to Step S1706, where the shooting process is executed. The shooting process is identical to that described above in the third embodiment, and thus descriptions thereof shall be omitted. When the shooting process in Step S1706 finishes, the procedure moves to Step S1707, where a storage process for storing the image data created through the shooting process in an HDD 200 is carried out. The storage process shall be described later with reference to FIG. 18. When the storage process finishes, the procedure moves to Step S1708, where the power saving timer is reset and measurement of the predetermined amount of time begins again.

Next, if it has been determined in Step S1702 that the menu operation switch 121 has been manipulated, thereby instructing a display to be performed on the display unit 110, the procedure moves to Step S1710, and a display process is executed. The display process shall be described later with reference to FIG. 19. When the display process in Step S1710 finishes, the procedure moves to Step S1711, where the state of the display unit 110 is determined and power saving control is performed. To be more specific, in Step S1711, it is determined whether a menu is being displayed. If in Step S1711 it is determined that the menu is being displayed, the procedure returns to Step S1701. IN other words, the HDD 200 is kept in the normal mode.

However, if in Step S1711 it is determined that the menu is not currently being displayed, the procedure moves to Step S1712, where it is determined whether or not an image is currently being played back. If an image is currently being played back, it is judged, in Step S1713, whether or not the HDD 200 is specified as the current medium. If the HDD 200 is the current medium, the procedure returns to Step S1701. In other words, if an image is currently being played back and the HDD 200 is the current medium, the HDD 200 is kept in the normal mode. If an image is not currently being played back (No in Step S1712), and the HDD 200 is not the current medium (No in Step S1713), the procedure moves to Step S1714, where the power saving timer is reset and measurement of the predetermined amount of time begins again.

[Exemplary Storage Process]

Next, a storage process for storing image data created through the shooting process in the storage medium (Step S1707 in FIG. 17) shall be described with reference to FIG. 18.

First, in Step S1801, it is determined whether or not the HDD 200 is the current medium. If the HDD 200 is the current medium, the procedure moves to Step S1802, it is determined whether the startup process has been completed, or in other words, whether the HDD 200 has come out of the power saving mode and reading from/writing to the HDD 200 is possible. If the startup process has not finished, the system waits for the startup process to finish. If the startup process is complete and the HDD 200 is in the normal mode, the procedure moves to Step S1803. In Step S1803, the image data temporarily stored in the memory 113 is written into the HDD 200 under a hierarchical folder structure compliant with a predetermined rule thereof, and is stored in the HDD 200 thereby; after this, the storage process ends.

Next, if in Step S1801 it has been determined that the HDD 200 is not the current medium, the procedure moves to Step S1804. In Step S1804, the image data temporarily stored in the memory 113 is written into the memory card 300 under a hierarchical folder structure compliant with a predetermined rule thereof, and is stored in the memory card 300 thereby; after this, the storage process ends.

[Exemplary Display Process]

Next, a process for reading out image data stored in a storage medium and executing a play back of the image data in a display unit 110, a process for displaying setting menu items, and so on (Step S1710 in FIG. 17), shall be described with reference to FIG. 19.

First, in Step S1901, it is determined whether or not the play back key of the menu operation switch 121 has been manipulated. If the play back key has been manipulated, the procedure moves to Step S1902, where it is determined whether or not an image is currently being played back. If an image is not currently being played back, the procedure moves to Step S1903, where it is determined whether or not the HDD 200 is the current medium. If the memory card 300 is the current medium, the procedure moves to Step S1905. However, if the HDD 200 is the current medium, the startup process for the HDD 200 is carried out in Step S1904, starting up the HDD 200 from the power saving mode to the normal mode. The procedure moves to Step S1905 when the startup process finishes.

In Step S1905, the image data is read out from the current medium (the HDD 200 if the current medium is the HDD 200, or the memory card 300 if the current medium is the memory card 300) and into the image display memory 112. Then, in Step S1906, the display control circuit 109 is controlled so that the image data is played back/displayed on the display unit 110, and the image data is played back; after the play back finishes, the display process ends while maintaining the state of play back. If in Step S1902 it is determined that an image is not currently being played back, the procedure moves to Step S1907, where the image play back finishes and the display process ends.

Next, if in Step S1901 it has been determined that the play back key has not been manipulated, the procedure moves to Step S1908, where it is determined whether or not the menu key has been manipulated. If the menu key has been manipulated, the procedure moves to Step S1909, where it is determined whether a menu is currently being displayed. If the menu is not currently being displayed, the startup of the HDD 200 is instructed (Step S1915); the procedure moves to Step S1910 without waiting for the startup process for the HDD 200 to finish, and menu items are displayed.

Next, the procedure moves to Step S1911, where processing is performed in accordance with menu selection operations. Here, if the processing is a process performed on a file within the HDD 200, the process is performed after waiting for the HDD 200 to finish starting up. A process for copying image data from the memory card 300 to the HDD 200 can be considered as an example of such a process, and even if the HDD 200 is not the current medium, the process can be executed faster by starting up the HDD 200 using the operation of the menu key. Here, when the menu selection process finishes, the display process ends while maintaining the display of the menu items. If in Step S1909 menu items are currently being displayed, the procedure moves to Step S1907, where the menu item display on the display unit 110 finishes and the display process ends.

Next, if in Step S1908 it has been determined that the menu key has not been manipulated, the procedure moves to Step S1912, where it is determined whether or not the cross key has been manipulated. If the cross key has been manipulated, the procedure moves to Step S1913, where it is determined whether or not an image is currently being played back. If an image is currently being played back, the procedure moves to Step S1905, where one of the images previous or subsequent to the currently played back/displayed image is read out and played back in accordance with the manipulation of the cross key.

If in Step S1913 it is determined that an image is not currently being played back, the procedure moves to Step S1914, where it is determined whether or not the menu is currently being displayed. If the menu is currently being displayed, the procedure moves to Step S1911, where processing is performed in accordance with menu selection operations. If in Step S1912 it is determined that the cross key has not been manipulated, the series of display processes finishes.

In this manner, in the present embodiment, when there are plural storage mediums, the power saving mode of the storage medium is controlled based on which storage medium has been specified for storing image data.

In other words, when the HDD 200 has been specified as the storage medium, the power saving mode of the HDD 200 is stopped and the normal mode maintained while the play back process is being carried out. Moreover, the storage medium is prohibited from entering the power saving mode when image data within the HDD 200 is being repeatedly played back, menu selection operations are being repeatedly performed, and so on. For this reason, there is no need to, for example, play back an image, enter power saving mode, accept a cross key manipulation, wait for the startup process to finish, read out an image, and play back the image, each time an operation for selecting an image to play back is performed by manipulating the cross key (S1712, S11713, S1705); in other words, there is no need to wait for the storage medium 200 to start up. The same applies to the menu selection process.

Furthermore, when the HDD 200 has been specified as the storage medium, the power saving mode of the storage medium is maintained even when shooting operations are carried out. Accordingly, unnecessary processes are not executed, making it possible to cut back on the amount of power consumed.

As described thus far, in the present embodiment, power saving control is performed with respect to the storage medium 200 in accordance with which storage medium has been specified. In other words, when the HDD 200 is the current medium, the startup process for the HDD 200 is carried out in accordance with instructions to commence shooting operations. This makes it possible to prevent delays in the process for storing image data caused by late startup of the storage medium.

Moreover, the startup process is executed for the HDD 200 in accordance with instructions for commencing play back operations. This makes it possible to prevent delays in reading out image data from within the HDD 200, processes for changing image data, access to the HDD 200, and so on, caused by late startup of the storage medium.

Further still, startup of the power saving mode of the HDD 200 is controlled in accordance with the state of the display unit 110. In other words, when image data, menu items, or the like are being displayed on the display unit 110, it is highly likely that the HDD 200 will be accessed, and thus the power saving mode is stopped and the normal mode is maintained. This makes it possible to prevent delays in reading out image data from within the HDD 200, processes for changing image data, access to the HDD 200, and so on, caused by late startup of the storage medium, such as when repeatedly selecting/displaying images.

Furthermore, when the HDD 200 is not the current medium, the startup process for the HDD 200 is not carried out in accordance with instructions to commence shooting operations, and the power saving mode is maintained. This makes it possible to reduce the amount of power consumed by not using unnecessary power.

Moreover, the startup process for the HDD 200 is not executed, and the power saving mode is maintained, in accordance with instructions made to commence play back operations made by manipulating the play back key. This makes it possible to reduce the amount of power consumed by not using unnecessary power.

Furthermore, the startup process is executed for the HDD 200 in accordance with instructions for commencing play back operations made by manipulating the menu key. This makes it possible to prevent delays in reading out image data from within the HDD 200, processes for changing image data, access to the HDD 200, and so on, caused by late startup of the HDD 200.

Further still, startup of the power saving mode of the HDD 200 is controlled in accordance with the state of the display unit 110. In other words, when menu items are being displayed on the display unit 110 due to menu operations, it is highly likely that the HDD 200 will be accessed, and thus the power saving mode is stopped and the normal mode is maintained. This makes it possible to prevent delays in reading out image data from within the HDD 200, processes for changing image data, access to the HDD 200, and so on, caused by late startup of the HDD, such as when repeatedly selecting/displaying images.

In this manner, in the present embodiment, the storage medium is started up from the power saving mode in accordance with which storage medium has been specified, shooting operations, play back operations, and so on, eliminating the need for the user to concern him/herself with power saving operations, and making it possible to enter the power saving mode automatically. Therefore, it is possible to achieve both a reduction in power consumption and an improvement in operability in the digital camera by appropriately controlling switches from the normal mode to the power saving mode and from the power saving mode to the normal mode.

It is noted that although only the HDD is controlled so as to use the power saving mode in the present embodiment, the power saving mode may be applied to the memory card as well.

Furthermore, in the present embodiment, although the power saving mode is prohibited in accordance with the state of the display unit 110, a control that, for example, extends the power saving timer beyond the normal limit may be employed. For example, if the power saving timer goes to 5 seconds, a control that sets the timer to 30 seconds is possible.

And also, while a USB-connected HDD has been given as an example of the external storage medium in the present embodiment, other types of connections and other external storage mediums, such as, for example, an optical disk, may be used instead.

Furthermore, although in the present embodiment it is possible to specify a single storage medium as the current medium from among two storage media, it may be made possible to simultaneously store data in two storage media, and both of the storage media are controlled so as to enter the normal mode in accordance with the shooting operations.

Fifth Exemplary Embodiment

Next, a digital camera according to a fifth embodiment of the present invention shall be described with reference to FIGS. 20 and 21. Note that elements that overlap with or are equivalent to those in the above third embodiment shall be given identical reference numerals.

The digital camera according to the present embodiment is identical to the abovementioned third and fourth embodiments, but is provided with a means for selecting whether or not to use a power saving mode of a storage medium.

Figure 20:
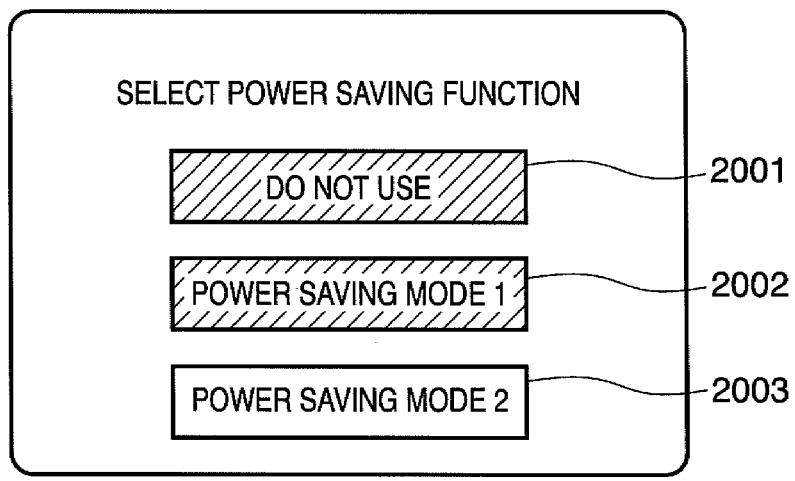
FIG. 20 is a diagram illustrating an interchangeable lens-type digital camera according to a fifth embodiment of the present invention, and illustrates an example of a screen for selecting a power saving mode.

FIG. 20 illustrates an example of a screen for selecting use of a power saving mode for the storage medium; this screen is displayed on the display unit 110, and the mode is selected by the user.

Here, a selection item "do not use" 2001 is an item selected when the power saving mode is not to be used, and cancels the power saving mode. When this item is selected, the storage medium is kept in a normal mode, and as a result is in a mode that gives priority to responsiveness.

A selection item "power saving mode 1" 2002 is an item selected when a power saving mode is to be used, and the controls thereof are equivalent to the controls described in the above first through fourth embodiments.

A selection item "power saving mode 2" 2003 is an item selected when another power saving mode is to be used, and is an item for selecting a mode that performs control so as to reduce the amount of power consumed even beyond that of "power saving mode 1".

Next, operations performed by the digital camera when the "power saving mode 2" is selected in the screen illustrated in FIG. 20 shall be described.

[Exemplary Main Sequence]

Figure 21:
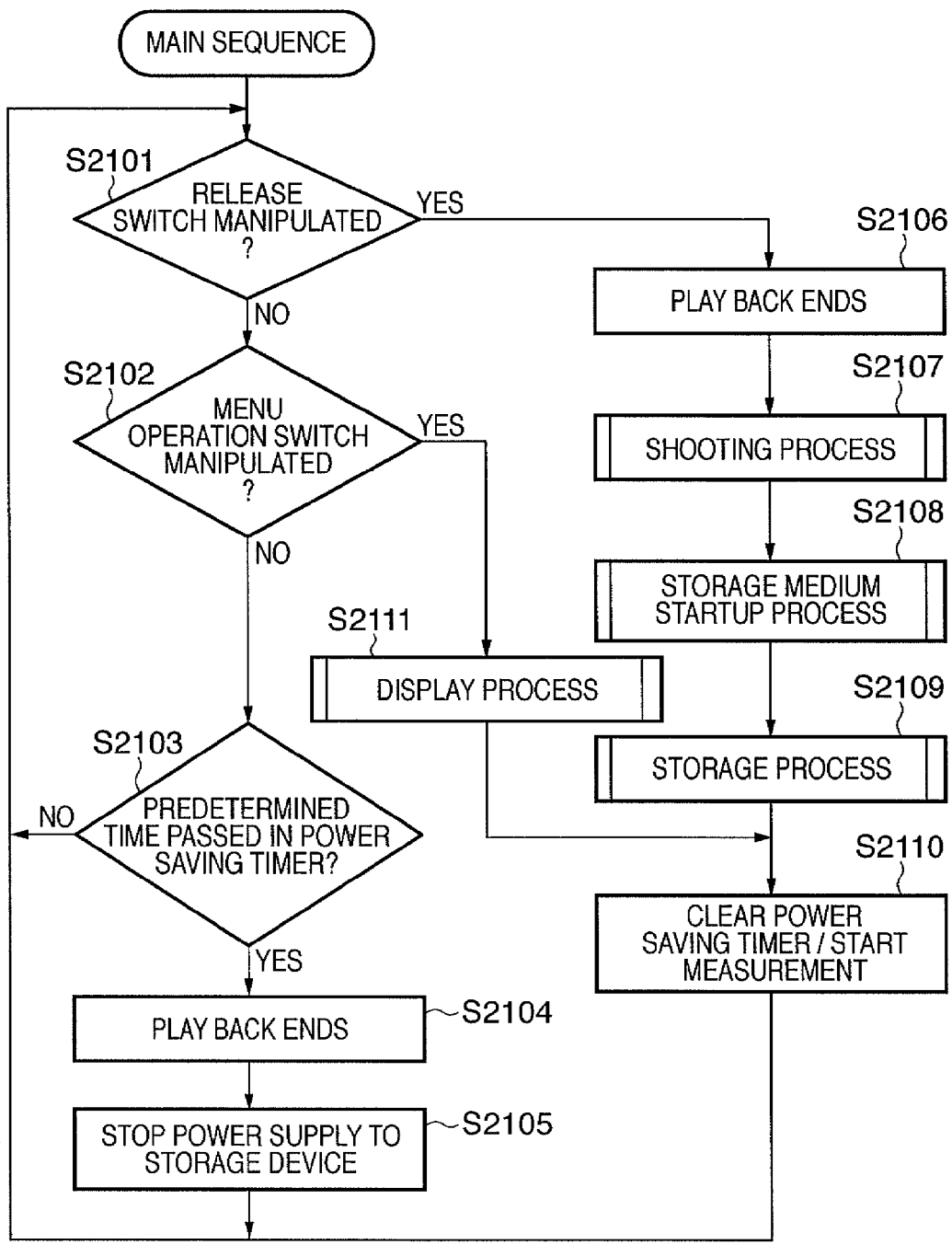
FIG. 21 is a flowchart illustrating a main sequence of operations of an image input apparatus.
Figure 22:
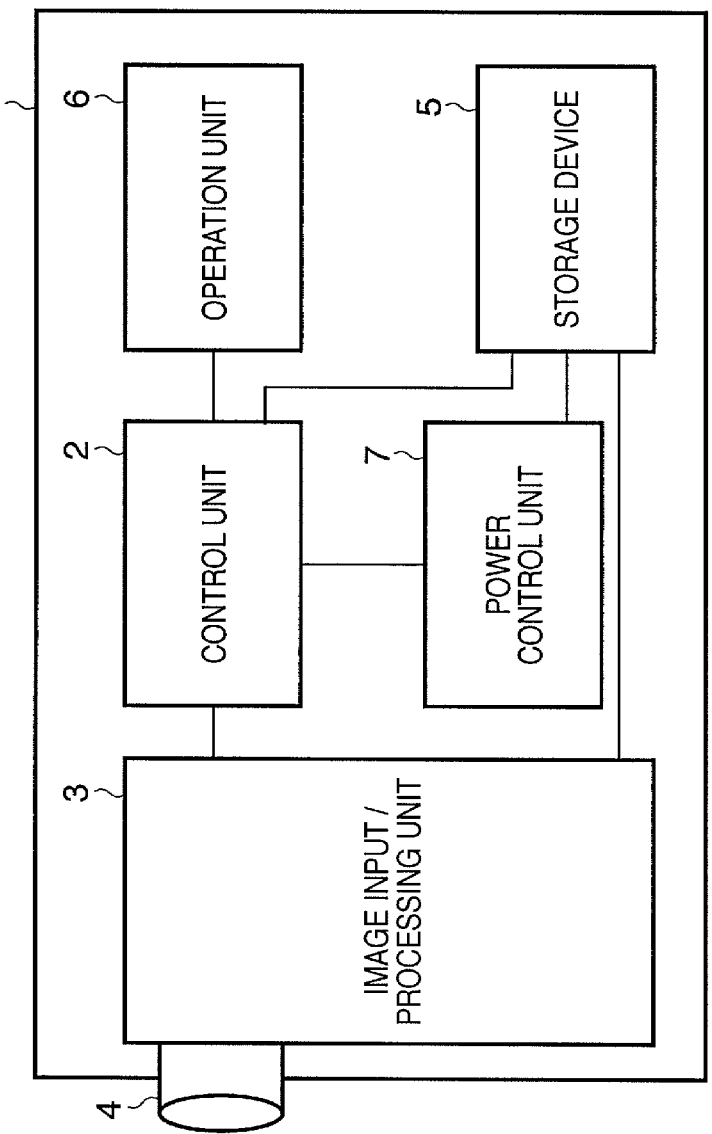
FIG. 22 illustrates a configuration of a conventional image input apparatus.
Figure 23:
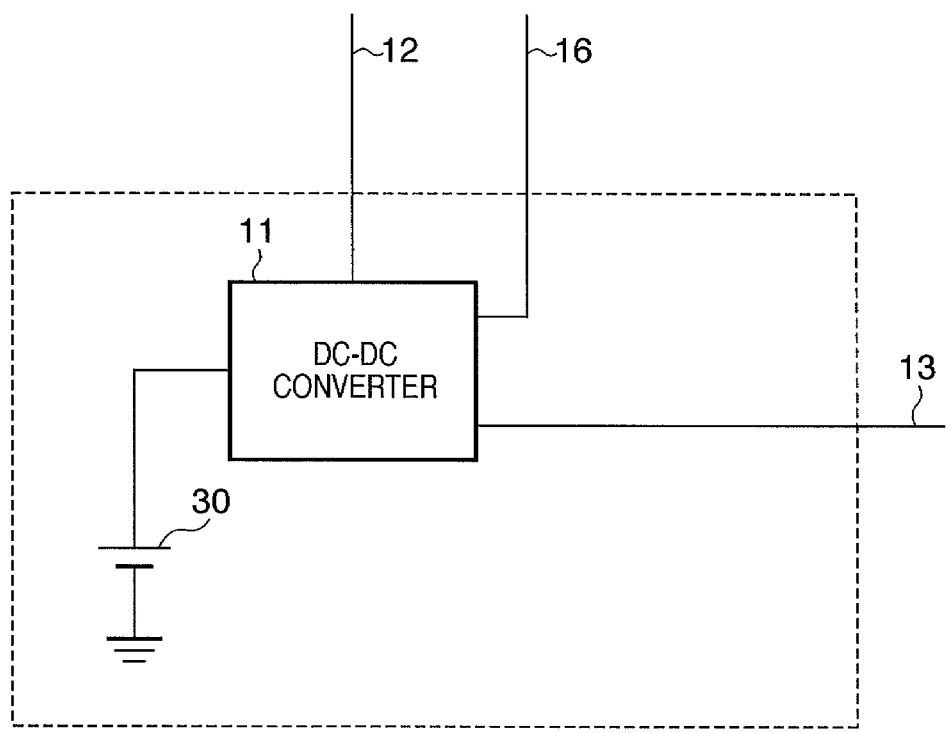
FIG. 23 illustrates a configuration of a conventional power control unit.

FIG. 21 is a flowchart illustrating a main sequence of operations performed by the digital camera according to the present embodiment, and specifically illustrates a series of processes from shooting to storage and display processing, as well as a sequence for a power saving mode of a storage medium 200. Here, the processes in FIG. 21 are carried out through processing programs stored in a predetermined storage area (a ROM, hard disk, or the like) being loaded into a RAM and executed by the CPU of a microcomputer 127.

First, in Step S2101, it is determined whether or not an SW1 has been manipulated and turned on by a release switch 120 being depressed halfway, thereby instructing shooting operations to be commenced. If the SW1 has not been manipulated, the procedure moves to Step S2102, where it is determined if the menu operation switch 121 has been manipulated, thereby instructing a display to be performed on the display unit 110. If the menu operation switch 121 has not been manipulated, the procedure moves to Step S2103. In Step S2103, it is determined whether or not a power saving timer has counted a predetermined amount of time. If in Step S2103 it is determined that the predetermined amount of time as counted by the power saving timer has not passed, the sequence from Step S2101 is repeated.

However, if in Step S2103 it is determined that the predetermined amount of time as counted by the power saving timer has passed, the procedure moves to Step S2104, where if a display is being performed on the display unit 110, that display is ended; after this, the procedure moves to Step S2105, where storage medium 200 is put into the power saving mode. Note that the storage medium 200 is kept in the power saving mode if it is already in the power saving mode. In the power saving mode, the power supply to the storage medium 200 is stopped, and the operations of the storage medium 200 are stopped as well.

Note that the power supply to the storage medium 200 can be stopped at the point in time when the storage of image data, the play back of image data, or the like finishes, as per the first or second embodiment, rather than using the power saving timer.

Next, if in Step S2101 the SW1 has been manipulated and turned on by the release switch 120 being depressed halfway, thereby instructing shooting operations to be commenced, the procedure moves to Step S2106, where if a display is being performed by the display unit 110, that display is ended. Next, the procedure moves to Step S2107, where the shooting process is executed. When the shooting process in Step S2107 finishes, the procedure moves to Step S2108, where the startup process for the storage medium 200 is performed; the storage medium 200 is started up from the power saving mode to the normal mode. When the startup process finishes, the procedure moves to Step S2109, where a storage process for storing the image file created by the shooting process into the storage medium 200 is performed. The storage process is identical to that described above in the third embodiment, and thus descriptions thereof shall be omitted. When the storage process finishes, the procedure moves to Step S2110, where the power saving timer is reset and measurement of the predetermined amount of time begins again.

Next, if it has been determined in Step S2102 that the menu operation switch 121 has been manipulated, thereby instructing a display to be performed on the display unit 110, the procedure moves to Step S2111, and a display process is executed. The display process is identical to that described above in the third embodiment, and thus descriptions thereof shall be omitted. When the display process in Step S2111 finishes, the procedure moves to Step S2110, where the power saving timer is reset and measurement of the predetermined amount of time begins again. Thereafter, the procedure returns to Step S2101, and the sequence is repeated.

In this manner, in the present embodiment, when the "power saving mode 2" is selected, control is performed so that the power saving timer is started and the storage medium 200 enters the power saving mode after reading/writing from/to the storage medium 200 finishes, regardless of the state of the display unit 110. Accordingly, it can be made possible for the user to select a means for reducing the amount of power consumed.

Note that although the descriptions of FIG. 21 describe a case in which there is a single storage medium, such as in the abovementioned third embodiment, the present embodiment is not limited thereto, and may be applied to a case where plural storage media are used, such as with the abovementioned fourth embodiment.

As described thus far, the present embodiment is configured so that the user can select the power saving mode. For this reason, when "do not use" is selected for the power saving mode, even a storage medium with a slow startup is capable of the same usability as a memory card.

Furthermore, when the "power saving mode 1" is selected, the storage medium is started up from the power saving mode in accordance with shooting operations and play back operations, eliminating the need for the user to concern him/herself with power saving operations, and making it possible to enter the power saving mode automatically. Therefore, it is possible to achieve both a reduction in power consumption and an improvement in operability in the digital camera by appropriately controlling switches from the normal mode to the power saving mode and from the power saving mode to the normal mode.

Furthermore, when the "power saving mode 2" has been selected, it is possible to achieve an even greater reduction in the amount of power consumed. When the "power saving mode 2" is selected, the storage medium is started up from the power saving mode in accordance with shooting operations and play back operations, eliminating the need for the user to concern him/herself with power saving operations, and making it possible to enter the power saving mode automatically. Therefore, it is possible to achieve both a reduction in power consumption and an improvement in operability in the digital camera by appropriately controlling switches from the normal mode to the power saving mode and from the power saving mode to the normal mode.

Note that although the above-described embodiments have configurations in which the storage medium is connectable to the digital camera, the digital camera may be configured so as to be connectable to an adapter device that expands the functionality of the digital camera, and data may be stored in the storage medium via the adapter device.

Other Exemplary Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image input apparatus comprising:
   a power control unit that supplies power to a storage device connected to a connection unit; and
   a control unit that (a) controls the power control unit to supply power to a storage device connected to the connection unit if a power switch of the image input apparatus is turned on, (b) controls the power control unit not to supply power to a storage device connected to the connection unit after first identification information is acquired, wherein the first identification information is acquired from a storage device connected to the connection unit after the power switch is turned on, (c) controls the power control unit to supply power to a storage device connected to the connection unit if a release switch of the image input apparatus is turned on, and (d) causes a display unit to display predetermined data if the first identification information is different from second identification information, wherein the second identification information is acquired from a storage device connected to the connection unit after the release switch is turned on.

2. The image input apparatus according to claim 1, wherein the connection unit is connected to a storage device via a USB (Universal Serial Bus) interface.

3. The image input apparatus according to claim 1, wherein the image input apparatus acts as a USB (Universal Serial Bus) host if the connection unit is connected to a storage device via a USB interface.

4. The image input apparatus according to claim 1, wherein the control unit controls the power control unit not to supply power to a storage device connected to the connection unit after image data is stored in a storage device connected to the connection unit, and the image data includes data which is generated after the release switch is turned on.

5. An image input apparatus comprising:
a power control unit that supplies power to a storage device connected to a connection unit; and
a control unit that (a) controls the power control unit to supply power to a storage device connected to the connection unit if a power switch of the image input apparatus is turned on, (b) controls the power control unit not to supply power to a storage device connected to the connection unit after first identification information is acquired, wherein the first identification information is acquired from a storage device connected to the connection unit after the power switch is turned on, (c) controls the power control unit to supply power to a storage device connected to the connection unit if a playback switch of the image input apparatus is turned on, and (d) causes a display unit to display predetermined data if the first identification information is different from second identification information, wherein the second identification information is acquired from a storage device connected to the connection unit after the playback switch is turned on.

6. The image input apparatus according to claim 5, wherein the connection unit is connected to a storage device via a USB (Universal Serial Bus) interface.

7. The image input apparatus according to claim 5, wherein the image input apparatus acts as a USB (Universal Serial Bus) host if the connection unit is connected to a storage device via a USB interface.

8. The image input apparatus according to claim 5, wherein the control unit controls the power control unit not to supply power to a storage device connected to the connection unit after a playback of image data is finished.

9. The image input apparatus according to claim 1, wherein the predetermined data includes data indicating that the first identification information is different from the second identification information.

10. The image input apparatus according to claim 5, wherein the predetermined data includes data indicating that the first identification information is different from the second identification information.

11. A method for controlling an image input apparatus, wherein the image input apparatus includes a power control unit that supplies power to a storage device connected to a connection unit, the method comprising:
controlling the power control unit to supply power to a storage device connected to the connection unit if a power switch of the image input apparatus is turned on;
controlling the power control unit not to supply power to a storage device connected to the connection unit after first identification information is acquired, wherein the first identification information is acquired from a storage device connected to the connection unit after the power switch is turned on;
controlling the power control unit to supply power to a storage device connected to the connection unit if a release switch of the image input apparatus is turned on, and
causing a display unit to display predetermined data if the first identification information is different from second identification information, wherein the second identification is acquired from a storage device connected to the connection unit after the release switch is turned on.

12. A method for controlling an image input apparatus, wherein the image input apparatus includes a power control unit that supplies power to a storage device connected to a connection unit, the method comprising:
controlling the power control unit to supply power to a storage device connected to the connection unit if a power switch of the image input apparatus is turned on;
controlling the power control unit not to supply power to a storage device connected to the connection unit after first identification information is acquired, wherein the first identification information is acquired from a storage device connected to the connection unit after the power switch is turned on;
controlling the power control unit to supply power to a storage device connected to the connection unit if a playback switch of the image input apparatus is turned on, and
causing a display unit to display predetermined data if the first identification information is different from second identification information, wherein the second identification is acquired from a storage device connected to the connection unit after the playback switch is turned on.

13. The image input apparatus according to claim 1, further comprising an image capturing unit.

14. The image input apparatus according to claim 1, wherein the image input apparatus is one of a digital still camera, a digital video camera, a mobile telephone, and a computer.

15. The image input apparatus according to claim 1, further comprising:
a storing unit that stores image data generated based on an instruction of the release switch in a storage device connected to the connection unit.

16. The image input apparatus according to claim 1, wherein the release switch is used for instructing the image input apparatus to generate image data.

17. The image input apparatus according to claim 5, further comprising:
a reading unit that reads image data from a storage device connected to the connection unit.

18. The image input apparatus according to claim 5, wherein the image input apparatus is one of a digital still camera, a digital video camera, a mobile telephone, and a computer.

19. The image input apparatus according to claim 1, wherein the playback switch is used for instructing the image input apparatus to read image data from a storage device connected to the connection unit.

\* \* \* \* \*